US012659930B2

(12) United States Patent
Kuang et al.

(10) Patent No.: US 12,659,930 B2
(45) Date of Patent: Jun. 16, 2026

(54) PAGING INDICATION METHOD AND APPARATUS

(71) Applicant: HUAWEI TECHNOLOGIES CO., LTD., Shenzhen (CN)

(72) Inventors: Yiru Kuang, Beijing (CN); Rama Kumar Mopidevi, Lund (SE); Haibo Xu, Beijing (CN); Steven James Wenham, Cambridge (GB); Guowei Ouyang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/479,592

(22) Filed: Oct. 2, 2023

(65) Prior Publication Data

US 2024/0031988 A1     Jan. 25, 2024

Related U.S. Application Data

(63) Continuation of application No. PCT/CN2022/083618, filed on Mar. 29, 2022.

(30) Foreign Application Priority Data

Apr. 2, 2021   (CN) ......................... 202110362507.1
Apr. 12, 2021   (CN) ......................... 202110391098.8

(51) Int. Cl.
| | |
|---|---|
| *H04W 68/02* | (2009.01) |
| *H04W 60/00* | (2009.01) |
| *H04W 84/04* | (2009.01) |

(52) U.S. Cl.
CPC ........... *H04W 68/02* (2013.01); *H04W 60/00* (2013.01); *H04W 84/042* (2013.01)

(58) Field of Classification Search
CPC ... H04W 68/02; H04W 60/00; H04W 84/042; H04W 60/04; H04W 68/005
See application file for complete search history.

(56) References Cited

U.S. PATENT DOCUMENTS

| | | | | |
|---|---|---|---|---|
| 11,057,865 | B1 * | 7/2021 | Wong ................. | H04W 68/005 |
| 2016/0353350 | A1 * | 12/2016 | Engstrom ........... | H04W 36/324 |

(Continued)

FOREIGN PATENT DOCUMENTS

| | | |
|---|---|---|
| CA | 3132854 A1 | 9/2020 |
| CN | 101137195 A | 3/2008 |

(Continued)

OTHER PUBLICATIONS

Vivo, "Discussion on Supporting of Paging Cause," 3GPP TSG-RAN WG2 Meeting #113-e, e-Meeting, R2-2100476, XP051973653, total 5 pages, 3rd Generation Partnership Project, Valbonne, France (Jan. 25-Feb. 5, 2021).

(Continued)

*Primary Examiner* — Charles T Shedrick
(74) *Attorney, Agent, or Firm* — Leydig, Voit & Mayer, Ltd.

(57) ABSTRACT

This application discloses a paging indication method and an apparatus. The method includes: A UE obtains first indication information, where the first indication information indicates whether a core network device supports a paging cause value; and receives a first paging message, where the first paging message includes first information corresponding to the UE, and the first information does not include a first field indicating the paging cause value; and when the first indication information indicates that the core network device supports the paging cause value, the first information indicates the paging cause value. According to the method provided in this application, the UE can explicitly learn (Continued)

whether the paging cause value is indicated in information that is in a paging message and that corresponds to the UE.

16 Claims, 3 Drawing Sheets

(56) References Cited

U.S. PATENT DOCUMENTS

| | | | | |
|---|---|---|---|---|
| 2018/0007626 | A1 | 1/2018 | Tenny et al. | |
| 2021/0127351 | A1* | 4/2021 | Stojanovski | H04W 48/16 |
| 2021/0337506 | A1* | 10/2021 | Fiorani | H04W 68/02 |
| 2021/0352619 | A1* | 11/2021 | Ryu | H04W 68/005 |
| 2021/0392616 | A1* | 12/2021 | Stojanovski | H04W 68/005 |
| 2022/0217675 | A1 | 7/2022 | Chen et al. | |
| 2022/0240212 | A1* | 7/2022 | Chun | H04W 68/12 |
| 2022/0369211 | A1* | 11/2022 | Agiwal | H04W 48/16 |
| 2023/0040747 | A1* | 2/2023 | Watfa | H04W 8/183 |
| 2023/0045765 | A1* | 2/2023 | Youn | H04W 60/005 |
| 2023/0362884 | A1* | 11/2023 | Ke | H04W 68/005 |
| 2024/0023067 | A1* | 1/2024 | Ke | H04W 68/005 |
| 2025/0081161 | A1* | 3/2025 | Saha | H04W 68/005 |
| 2025/0298499 | A1* | 9/2025 | Yao | G06F 16/9566 |

FOREIGN PATENT DOCUMENTS

| | | |
|---|---|---|
| CN | 110035498 A | 7/2019 |
| CN | 110730445 A | 1/2020 |
| CN | 111867057 A | 10/2020 |
| CN | 112291845 A | 1/2021 |
| CN | 112449378 A | 3/2021 |
| CN | 112205041 B | 8/2022 |
| WO | 2020106611 A1 | 5/2020 |
| WO | 2022147707 A1 | 7/2022 |

OTHER PUBLICATIONS

China Telecom, "Introduction of Paging Cause," 3GPP TSG-RAN WG2 Meeting #113bis-e, Electronic, R2-2103304, XP051992045, total 7 pages, 3rd Generation Partnership Project, Valbonne, France (Apr. 12-23, 2021).

Qualcomm Incorporated et al., "Paging cause to the UE," SA WG2 Meeting #126, S2-181868, Total 2 pages, 3rd Generation Partnership Project, Valbonne, France (Feb. 26-Mar. 2, 2018).

"3rd Generation Partnership Project; Technical Specification Group Services and System Aspects; Procedures for the 5G System (5GS); Stage 2 (Release 17)," 3GPP TS 23.502 V17.0.0, Total 640 pages, 3rd Generation Partnership Project, Valbonne, France (Mar. 2021).

"3rd Generation Partnership Project; Technical Specification Group Radio Access Network; NR; Radio Resource Control (RRC) protocol specification (Release 15)," 3GPP TS 38.331 V15.13.0, total 537 pages (Mar. 2021).

"Consideration on the Paging with Service Indication," 3GPP TSG-RAN WG2 Meeting #113-e, R2-2100430, Total 3 pages, 3rd Generation Partnership Project, Valbonne, France (Jan. 25-Feb. 5, 2021).

"3rd Generation Partnership Project; Technical Specification Group Services and System Aspects; Study on system enablers for devices having multiple Universal Subscriber Identity Modules (USIM (Release 17)," 3GPP TR 23.761 V1.3.0, Total 106 pages, 3rd Generation Partnership Project, Valbonne, France (Mar. 2021).

* cited by examiner

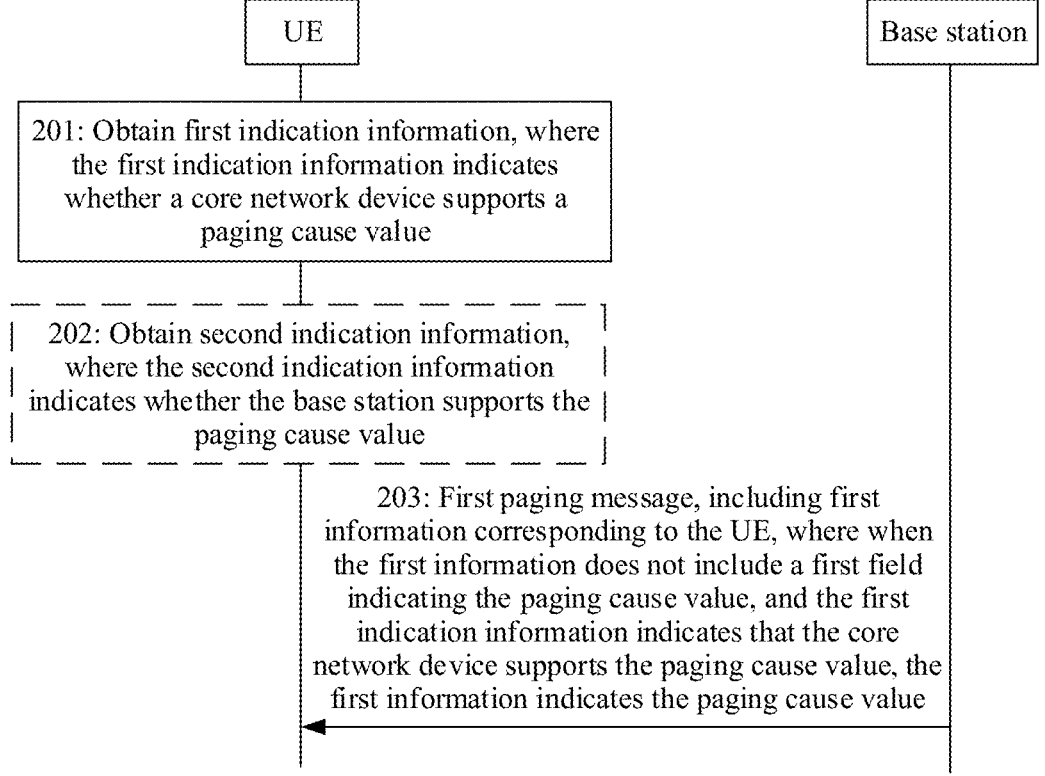

201: Obtain first indication information, where the first indication information indicates whether a core network device supports a paging cause value 202: Obtain second indication information, where the second indication information indicates whether the base station supports the paging cause value 203: First paging message, including first information corresponding to the UE, where when the first information does not include a first field indicating the paging cause value, and the first indication information indicates that the core network device supports the paging cause value, the first information indicates the paging cause value

FIG. 2

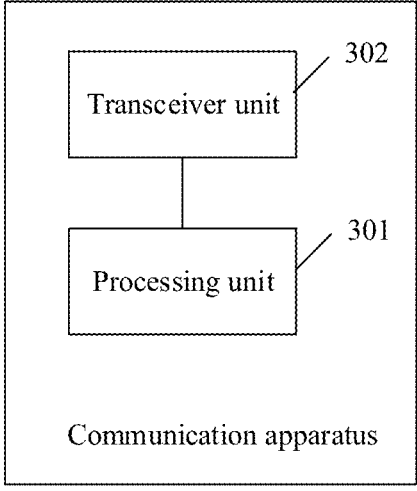

302

Transceiver unit

301

Processing unit

Communication apparatus

FIG. 3

PAGING INDICATION METHOD AND APPARATUS

CROSS-REFERENCE TO RELATED APPLICATIONS

This application is a continuation of International Application No. PCT/CN2022/083618, filed on Mar. 29, 2022, which claims priority to Chinese Patent Application No. 202110362507.1, filed on Apr. 2, 2021, and Chinese Patent Application No. 202110391098.8, filed on Apr. 12, 2021. All of the afore-mentioned patent applications are hereby incorporated by reference in their entireties.

TECHNICAL FIELD

Embodiments of this application relate to the field of communication technologies, and in particular, to a paging indication method and an apparatus.

BACKGROUND

A discontinuous reception (DRX) mechanism in a long term evolution (LTE) technology is still used in a 5th generation (5G) new radio (NR) technology. The DRX mechanism includes a DRX cycle. A terminal device periodically stays "awake" for a period of time within the DRX cycle. A possible cycle is 32, 64, 128, or 256 radio frames. The terminal device may remain in a "sleep" state in the rest of the DRX cycle, to reduce power consumption.

In addition, when the terminal device is in an idle state or an inactive state of radio resource control (RRC), if a network side needs to send downlink data to the terminal device (for example, there is a call that needs to be made to the device, or data that needs to be transmitted to the device), the network side first sends a paging message to the terminal device. After receiving the paging message, the terminal device initiates an RRC connection establishment process to receive the downlink data.

Therefore, how to enable the terminal device to explicitly obtain content in the paging message needs to be urgently resolved.

SUMMARY

This application provides a paging indication method and an apparatus, so that a terminal device can explicitly learn whether a paging cause value is indicated in information that is in a paging message and that corresponds to the terminal device.

According to a first aspect, an embodiment of this application provides a paging indication method. The method is applied to a communication apparatus, and the communication apparatus includes a terminal device, a chip in a terminal device, or the like. The method includes:

obtaining first indication information, where the first indication information indicates whether a core network device supports a paging cause value; and receiving a first paging message, where the first paging message includes first information corresponding to the terminal device, and the first information does not include a first field indicating the paging cause value; and when the first indication information indicates that the core network device supports the paging cause value, the first information indicates the paging cause value.

That the first indication information indicates whether a core network device supports a paging cause value may alternatively be understood as follows: The first indication information indicates whether the core network device sets (or, configures) the paging cause value, or the first indication information indicates whether the paging cause value is indicated in paging corresponding to the core network device, or the first indication information indicates whether the paging cause value is indicated in paging that is in a paging message (including the first paging message) and that corresponds to a first identifier of the terminal device, or the first indication information indicates whether the paging cause value is included in paging corresponding to the core network device, or the first indication information indicates whether paging that is in a paging message (including the first paging message) and that corresponds to a first identifier of the terminal device includes the paging cause value, or the first indication information indicates whether the core network device supports adding the paging cause value to a paging message (including the first paging message), or the first indication information indicates whether the core network device supports indicating or configuring the paging cause value in a paging message (including the first paging message). It may be understood that whether corresponding paging includes the paging cause value may be understood as whether corresponding paging explicitly includes the paging cause value and whether corresponding paging implicitly indicates (or implicitly includes) the paging cause value.

The first information may be understood as paging that is in the first paging message and that corresponds to the terminal device. For example, the first information includes an identifier of the terminal device. Therefore, information that is in the first paging message and that corresponds to the identifier of the terminal device may be understood as the first information.

The first field may also be referred to as a paging cause value field, a service type field, or the like. A specific name of the first field is not limited in embodiments of this application. The first field may be referred to as a paging cause value field because the first field may indicate the paging cause value. The first field may be referred to as a service type field because the paging cause value indicated by the first field may be a first service type, a second service type, or the like.

In an embodiment of this application, when the first indication information indicates that the core network device supports the paging cause value, that the first information indicates the paging cause value may alternatively be understood as follows: When the first indication information indicates that the core network device supports the paging cause value, the first information indicates the paging cause value, or paging corresponding to the core network device indicates the paging cause value, or paging corresponding to the core network device supports the paging cause value, or the paging cause value and the like are set in paging corresponding to the core network device. In other words, although the first information does not explicitly include the first field indicating the paging cause value, it may be learned, based on the first indication information, that the first information implicitly indicates the paging cause value. For example, that the first information indicates the paging cause value may alternatively be understood as follows: The first information indicates the paging cause value. In other words, the terminal device may determine, based on the first indication information, that the core network device indicates the paging cause value.

It may be understood that this embodiment of this application may be alternatively replaced by: obtaining first indication information, where the first indication information indicates whether a core network device supports a paging cause value; and receiving a first paging message, where the first paging message includes first information corresponding to the terminal device, and when the first information does not include a first field indicating the paging cause value, and the first indication information indicates that the core network device supports the paging cause value, the first information indicates the paging cause value.

Usually, when the first information does not include the first field indicating the paging cause value, the terminal device considers that the paging cause value indicated by the first information is a first service type (for example, a non-voice service), or considers that the first information does not indicate the paging cause value, or the like. As a result, the terminal device cannot correctly understand the first information. However, in the technical solutions provided in embodiments of this application, because the first indication information may indicate whether the core network device supports the paging cause value, when the first indication information indicates that the core network device supports the paging cause value, even if the first information does not include the first field, the terminal device can obtain the paging cause value indicated in the first information. Therefore, the terminal device can correctly understand the first information, and the terminal device can clearly learn whether the paging cause value is indicated in the paging message, thereby improving user experience.

In a possible implementation, when the first indication information indicates that the core network device does not support the paging cause value, the first information does not indicate the paging cause value.

The first information does not indicate the paging cause value. To be specific, because the core network device does not support the paging cause value, the first information does not indicate the paging cause value.

It may be understood that the foregoing implementation may be alternatively replaced by: When the first information does not include the first field indicating the paging cause value, and the first indication information indicates that the core network device does not support the paging cause value, the first information does not indicate the paging cause value.

In a possible implementation, when the first information includes the first field, the first information indicates a second service type (for example, a voice service).

That the first information indicates the second service type may alternatively be understood as follows: The paging cause value indicated by the first information is the second service type.

In a possible implementation, the first indication information indicates whether the core network device corresponding to a public land mobile network (PLMN) supports the paging cause value, or the first indication information indicates whether the core network devices corresponding to a plurality of PLMNs support the paging cause value.

In an embodiment of this application, when the first indication information indicates whether the core network devices corresponding to the plurality of PLMNs support the paging cause value, the first indication information may indicate an identifier of a PLMN. For example, one PLMN corresponds to one piece of indication information (namely, indication information indicating whether the paging cause value is supported). For another example, there are only two cases of whether the paging cause value is supported. Therefore, some of the plurality of PLMNs may correspond to one piece of indication information, and the other PLMNs may correspond to one piece of indication information.

In a possible implementation, different core network devices belong to different public land mobile networks (PLMNs).

In a possible implementation, the method further includes: determining, based on the first indication information, whether a core network device corresponding to a first PLMN supports the paging cause value, where the first PLMN is a PLMN serving the terminal device.

Alternatively, the foregoing implementation may be understood as follows: The first indication information includes indication information indicating whether a core network device corresponding to a first PLMN supports the paging cause value, where the first PLMN is a PLMN serving the terminal device.

In a possible implementation, the first information corresponds to paging initiated by the core network device.

In a possible implementation, the first paging message includes a second field indicating the paging cause value. When the first information includes the first field, the first field is included in the second field.

For example, the first field may be understood as a subfield of the second field.

In a possible implementation, the method further includes: obtaining second indication information, where the second indication information indicates whether an access network device supports the paging cause value.

It may be understood that for descriptions of the second indication information, refer to the descriptions of the first indication information. For example, the second indication information indicates whether the access network device sets (or, configures) the paging cause value, and the like. Details are not described herein.

In a possible implementation, when the second indication information indicates that the access network device supports the paging cause value, the first paging message includes the second field indicating the paging cause value. When the first information includes the first field, the first field is included in the second field.

In a possible implementation, the first paging message further includes second information, and the second information corresponds to paging initiated by the access network device.

In a possible implementation, the first indication information is included in any one of the following messages:
a non-access stratum (NAS) message, a system information block (SIB), the first paging message, or downlink control information (DCI) used to schedule the first paging message.

In a possible implementation, the method further includes: sending, by the terminal device, a registration request message to the core network device; and receiving, by the terminal device, a registration accept message from the core network device, where the registration accept message includes the first indication information.

In a possible implementation, the first indication information is carried in a third field. When the third field does not exist, the first indication information indicates that the core network device does not support the paging cause value. When the third field exists, the first indication information indicates that the core network device supports the paging cause value.

In a possible implementation, when a value of the third field is a first value, the first indication information indicates that the core network device supports the paging cause value, or when a value of the third field is a second value, the first indication information indicates that the core network device does not support the paging cause value.

In a possible implementation, the second indication information is carried in a fourth field. When the fourth field does not exist, the second indication information indicates that the access network device does not support the paging cause value. When the fourth field exists, the second indication information indicates that the access network device supports the paging cause value.

In a possible implementation, when a value of the fourth field is a third value, the second indication information indicates that the access network device supports the paging cause value, or when a value of the fourth field is a fourth value, the second indication information indicates that the access network device does not support the paging cause value.

It may be understood that the first value shown above may be equal to the third value, or the first value shown above may not be equal to the third value. In addition, the second value may be equal to the fourth value, or the second value may not be equal to the fourth value. This is not limited in embodiments of this application.

According to a second aspect, an embodiment of this application provides a paging indication method. The method is applied to a communication apparatus, and the communication apparatus includes an access network device, a chip in an access network device, or the like. The method includes:

obtaining first indication information, where the first indication information indicates whether a core network device supports a paging cause value; sending the first indication information to a terminal device; and sending a first paging message to the terminal device, where the first paging message includes first information corresponding to the terminal device, and the first information does not include a first field indicating the paging cause value; and when the first indication information indicates that the core network device supports the paging cause value, the first information indicates the paging cause value.

It may be understood that for specific descriptions of the second aspect, refer to the first aspect. Details are not described herein again.

In a possible implementation, the obtaining first indication information includes:

obtaining the first indication information based on third indication information from the core network device, where the third indication information indicates whether the core network device supports the paging cause value; or obtaining the first indication information from an operation, administration and maintenance (OAM) device; or receiving a second paging message from the core network device, and obtaining the first indication information based on a first field included in the second paging message.

It may be understood that for descriptions of the third indication information, refer to the foregoing descriptions of the first indication information. Details are not described herein again.

In a possible implementation, when the first indication information indicates that the core network device does not support the paging cause value, the first information does not indicate the paging cause value.

In a possible implementation, when the first information includes the first field, the first information indicates a second service type (for example, a voice service).

In a possible implementation, the first indication information indicates whether the core network device supports the paging cause value, or the first indication information indicates whether a plurality of core network devices support the paging cause value.

In a possible implementation, the first information corresponds to paging initiated by the core network device.

In a possible implementation, the first paging message includes a second field indicating the paging cause value. When the first information includes the first field, the first field is included in the second field.

In a possible implementation, the method further includes: sending second indication information to the terminal device, where the second indication information indicates whether the access network device supports the paging cause value.

In a possible implementation, when the second indication information indicates that the access network device supports the paging cause value, the first paging message includes the second field indicating the paging cause value. When the first information includes the first field, the first field is included in the second field.

In a possible implementation, the first paging message further includes second information, and the second information corresponds to paging initiated by the access network device.

In a possible implementation, the first indication information is included in any one of the following messages:

a non-access stratum NAS message, a system information block SIB, the first paging message, or downlink control information DCI used to schedule the first paging message.

In a possible implementation, the first indication information is carried in a third field. When the third field does not exist, the first indication information indicates that the core network device does not support the paging cause value. When the third field exists, the first indication information indicates that the core network device supports the paging cause value.

In a possible implementation, when a value of the third field is a first value, the first indication information indicates that the core network device supports the paging cause value, or when a value of the third field is a second value, the first indication information indicates that the core network device does not support the paging cause value.

In a possible implementation, the second indication information is carried in a fourth field. When the fourth field does not exist, the second indication information indicates that the access network device does not support the paging cause value. When the fourth field exists, the second indication information indicates that the access network device supports the paging cause value.

In a possible implementation, when a value of the fourth field is a third value, the second indication information indicates that the access network device supports the paging cause value, or when a value of the fourth field is a fourth value, the second indication information indicates that the access network device does not support the paging cause value.

According to a third aspect, an embodiment of this application provides a communication apparatus, configured to perform the method in any one of the first aspect or the possible implementations of the first aspect. The communication apparatus includes corresponding units for performing the method in any one of the first aspect and the possible implementations of the first aspect.

A processing unit is configured to obtain first indication information, where the first indication information indicates whether a core network device supports a paging cause value.

A transceiver unit is configured to receive a first paging message, where the first paging message includes first information corresponding to the communication apparatus, and the first information does not include a first field indicating the paging cause value. When the first indication information indicates that the core network device supports the paging cause value, the first information indicates the paging cause value.

In a possible implementation, when the first indication information indicates that the core network device does not support the paging cause value, the first information does not indicate the paging cause value.

In a possible implementation, the first indication information indicates whether the core network device corresponding to a PLMN supports the paging cause value, or the first indication information indicates whether the core network devices corresponding to a plurality of PLMNs support the paging cause value.

In a possible implementation, the processing unit is further configured to determine, based on the first indication information, whether a core network device corresponding to a first public land mobile network PLMN supports the paging cause value, where the first PLMN is a PLMN serving the communication apparatus.

In a possible implementation, the first paging message includes a second field indicating the paging cause value. When the first information includes the first field, the first field is included in the second field.

In a possible implementation, the processing unit is further configured to obtain second indication information, where the second indication information indicates whether the access network device supports the paging cause value.

In a possible implementation, when the second indication information indicates that the access network device supports the paging cause value, the first paging message includes the second field indicating the paging cause value. When the first information includes the first field, the first field is included in the second field.

In a possible implementation, the first paging message further includes second information, and the second information corresponds to paging initiated by the access network device.

In a possible implementation, the first indication information is included in any one of the following messages:

a non-access stratum NAS message, a system information block SIB, the first paging message, or downlink control information DCI used to schedule the first paging message.

In a possible implementation, the first indication information is carried in a third field. When the third field does not exist, the first indication information indicates that the core network device does not support the paging cause value. When the third field exists, the first indication information indicates that the core network device supports the paging cause value.

For example, the communication apparatus may be a terminal device, a chip in a terminal device, or the like.

According to a fourth aspect, an embodiment of this application provides a communication apparatus, configured to perform the method in any one of the second aspect or the possible implementations of the second aspect. The communication apparatus includes corresponding units configured to perform the method in any one of the second aspect or the possible implementations of the second aspect.

A transceiver unit is configured to send first indication information to a terminal device, where the first indication information indicates whether a core network device supports a paging cause value.

The transceiver unit is further configured to send a first paging message to the terminal device, where the first paging message includes first information corresponding to the terminal device, and the first information does not include a first field indicating the paging cause value. When the first indication information indicates that the core network device supports the paging cause value, the first information indicates the paging cause value.

In a possible implementation, a processing unit is configured to obtain the first indication information based on third indication information from the core network device, where the third indication information indicates whether the core network device supports the paging cause value; or a processing unit is configured to obtain the first indication information from an operation, administration and maintenance OAM device; or a processing unit is configured to: receive a second paging message from the core network device by using the transceiver unit, and obtain the first indication information based on a first field included in the second paging message.

In a possible implementation, when the first indication information indicates that the core network device does not support the paging cause value, the first information does not indicate the paging cause value.

In a possible implementation, the first indication information indicates whether the core network device corresponding to a PLMN supports the paging cause value, or the first indication information indicates whether the core network devices corresponding to a plurality of PLMNs support the paging cause value.

In a possible implementation, the first paging message includes a second field indicating the paging cause value. When the first information includes the first field, the first field is included in the second field.

In a possible implementation, the transceiver unit is further configured to send second indication information to the terminal device, where the second indication information indicates whether the communication apparatus supports the paging cause value.

In a possible implementation, when the second indication information indicates that the communication apparatus supports the paging cause value, the first paging message includes the second field indicating the paging cause value. When the first information includes the first field, the first field is included in the second field.

In a possible implementation, the first paging message further includes second information, and the second information corresponds to paging initiated by the communication apparatus.

In a possible implementation, the first indication information is included in any one of the following messages:

a non-access stratum NAS message, a system information block SIB, the first paging message, or downlink control information DCI used to schedule the first paging message.

In a possible implementation, the first indication information is carried in a third field. When the third field does not exist, the first indication information indicates that the core network device does not support the paging cause value. When the third field exists, the first indication information indicates that the core network device supports the paging cause value.

For example, the communication apparatus may be an access network device, a chip in an access network device, or the like.

In the third aspect or the fourth aspect, the communication apparatus may include a transceiver unit and a processing unit. For specific descriptions of the transceiver unit and the processing unit, refer to apparatus embodiments shown in the following.

According to a fifth aspect, an embodiment of this application provides a communication apparatus. The communication apparatus includes a processor, configured to perform the method in any one of the first aspect or the possible implementations of the first aspect. Alternatively, the processor is configured to execute a program stored in a memory. When the program is executed, the method in any one of the first aspect or the possible implementations of the first aspect is performed.

In a process of performing the foregoing method, a process of sending a message (for example, sending a registration request message) in the foregoing method may be understood as a process of outputting the foregoing message by the processor. When outputting the message, the processor outputs the message to a transceiver, so that the transceiver transmits the message. After the message is output by the processor, other processing may further need to be performed on the message before the message arrives at the transceiver. Similarly, when the processor receives an input message (for example, a first paging message or first indication information), the transceiver receives the foregoing message, and inputs the message into the processor. Further, after the transceiver receives the foregoing message, other processing may need to be performed on the foregoing message before the message is inputted into the processor.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory memory like a read-only memory (ROM). The memory and the processor may be integrated on a same chip, or may be separately disposed on different chips. A type of the memory and a manner of disposing the memory and the processor are not limited in embodiments of this application. It may be understood that descriptions of the processor and the memory are also applicable to the sixth aspect shown in the following. For ease of description, details are not described again in the sixth aspect.

In a possible implementation, the memory is located outside the communication apparatus.

In a possible implementation, the memory is located inside the communication apparatus.

In an embodiment of this application, the processor and the memory may alternatively be integrated into one component. In other words, the processor and the memory may alternatively be integrated together.

In a possible implementation, the communication apparatus further includes a transceiver. The transceiver is configured to receive or send a signal. For example, the transceiver may be further configured to receive the first paging message or the like.

In embodiments of this application, the communication apparatus may be a terminal device, a chip in a terminal device, or the like.

According to a sixth aspect, an embodiment of this application provides a communication apparatus. The communication apparatus includes a processor, configured to perform the method in any one of the second aspect or the possible implementations of the second aspect. Alternatively, the processor is configured to execute a program stored in a memory. When the program is executed, the method in any one of the second aspect or the possible implementations of the second aspect is performed.

In a possible implementation, the memory is located outside the communication apparatus.

In a possible implementation, the memory is located inside the communication apparatus.

In an embodiment of this application, the processor and the memory may alternatively be integrated into one component. In other words, the processor and the memory may alternatively be integrated together.

In a possible implementation, the communication apparatus further includes a transceiver. The transceiver is configured to receive or send a signal. For example, the transceiver may be configured to send a first paging message.

In embodiments of this application, the communication apparatus may be an access network device, a chip in an access network device, or the like.

According to a seventh aspect, an embodiment of this application provides a communication apparatus. The communication apparatus includes a logic circuit and an interface. The logic circuit is coupled to the interface, the logic circuit is configured to obtain first indication information, and the interface is configured to input a first paging message.

For example, the logic circuit may alternatively obtain the first indication information by using the interface.

For example, the logic circuit is further configured to determine, based on the first indication information, whether a core network device corresponding to a first PLMN supports a paging cause value.

For example, the logic circuit is further configured to obtain second indication information.

It may be understood that for descriptions of the first indication information, the first paging message, first information, or the like, refer to the descriptions of the first aspect or the second aspect, or refer to various embodiments shown below. Details are not described herein.

According to an eighth aspect, an embodiment of this application provides a communication apparatus. The communication apparatus includes a logic circuit and an interface. The logic circuit is coupled to the interface, the logic circuit is configured to obtain first indication information, and the interface is configured to output the first indication information and output a first paging message.

For example, the logic circuit may alternatively obtain the first indication information by using the interface.

It may be understood that for descriptions of the first indication information, the first paging message, first information, or the like, refer to the descriptions of the first aspect or the second aspect, or refer to various embodiments shown below. Details are not described herein.

According to a ninth aspect, an embodiment of this application provides a computer-readable storage medium. The computer-readable storage medium is configured to store a computer program, and when the computer program is run on a computer, the method in any one of the first aspect or the possible implementations of the first aspect is performed.

According to a tenth aspect, an embodiment of this application provides a computer-readable storage medium. The computer-readable storage medium is configured to store a computer program, and when the computer program is run on a computer, the method in any one of the second aspect or the possible implementations of the second aspect is performed.

According to an eleventh aspect, an embodiment of this application provides a computer program product. The computer program product includes a computer program or computer code, and when the computer program product runs on a computer, the method in any one of the first aspect or the possible implementations of the first aspect is performed.

According to a twelfth aspect, an embodiment of this application provides a computer program product. The computer program product includes a computer program or computer code, and when the computer program product runs on a computer, the method in any one of the second aspect or the possible implementations of the second aspect is performed.

According to a thirteenth aspect, an embodiment of this application provides a computer program. When the computer program is run on a computer, the method in any one of the first aspect or the possible implementations of the first aspect is performed.

According to a fourteenth aspect, an embodiment of this application provides a computer program. When the computer program is run on a computer, the method in any one of the second aspect or the possible implementations of the second aspect is performed.

According to a fifteenth aspect, an embodiment of this application provides a wireless communication system. The wireless communication system includes a terminal device and an access network device. The terminal device is configured to perform the method in any one of the first aspect or the possible implementations of the first aspect. The access network device is configured to perform the method in any one of the second aspect or the possible implementations of the second aspect.

BRIEF DESCRIPTION OF DRAWINGS

FIG. 2 is a schematic flowchart of a paging indication method according to an embodiment of this application; and FIG. 3 to FIG. 5 are schematic diagrams of structures of communication apparatuses according to an embodiment of this application.

DESCRIPTION OF EMBODIMENTS

Figure 1:
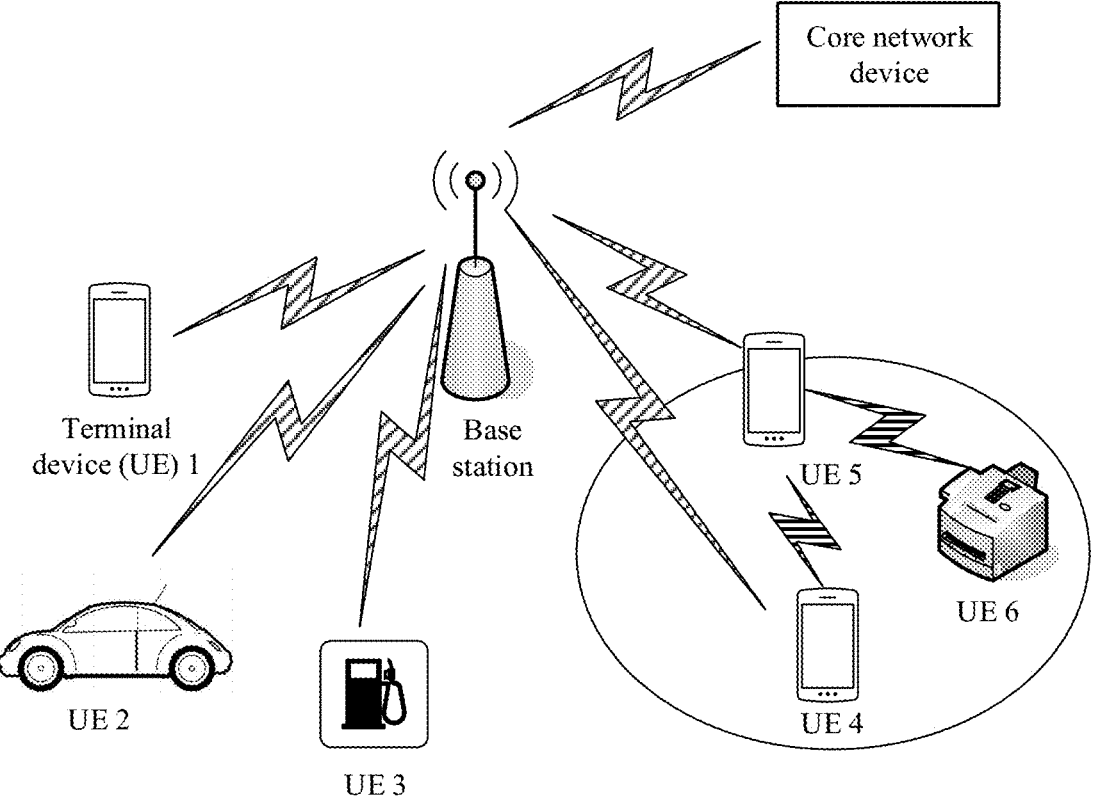
FIG. 1 is a schematic diagram of a communication system according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof means any combination of these items. For example, at least one (piece) of a, b, or c may represent: a, b, c, a and b, a and c, b and c, or a, b, and c.

A method provided in this application may be applied to various communication systems, for example, an Internet of things (IoT) system, a narrow band Internet of things (NB-IoT) system, a long term evolution (LTE) system, a 5th generation (5G) communication system, and a new communication system (for example, 6G) emerging in future communication development.

The technical solutions provided in this application may also be applied to a machine type communication (MTC) network, a long term evolution-machine type communication technology (LTE-M), a device-to-device (D2D) network, a machine to machine (M2M) network, an internet of things (IoT) network, or another network. The IoT network may include, for example, an internet of vehicles. Communication manners in an internet of vehicles system are collectively referred to as vehicle-to-everything (V2X, where X may represent everything). For example, V2X may include vehicle to vehicle (V2V) communication, vehicle to infrastructure (V2I) communication, vehicle to pedestrian (V2P) communication, or vehicle to network (V2N) communication. For example, in FIG. 1 shown below, terminal devices communicate with each other by using a D2D technology, an M2M technology, a V2X technology, or the like.

FIG. 1 is a schematic diagram of a communication system according to an embodiment of this application. The method embodiments shown below in this application may be applicable to the communication system shown in FIG. 1. Details are not described in the following.

Optionally, the communication system may include at least one access network device and at least one terminal device.

Optionally, the communication system may include at least one core network device and at least one terminal device.

Optionally, the communication system may include at least one access network device, at least one core network device, and at least one terminal device.

The access network device, the core network device, and the terminal device are separately described as follows.

For example, the access network device may be a next generation NodeB (gNB), a next generation evolved NodeB (ng-eNB) (eNB for short), an access network device in future 6G communication, or the like. The access network device may be any device having a wireless transceiver function, and includes but is not limited to the base station shown above. Alternatively, the base station may be a base station in a future communication system, for example, a 6th generation communication system. Optionally, the access network device may be an access node, a wireless relay node, a wireless backhaul node, or the like in a wireless local area network (wireless fidelity, Wi-Fi) system. Optionally, the access network device may be a radio controller in a cloud radio access network (CRAN) scenario. Optionally, the access network device may be a wearable device, a vehicle-mounted device, or the like. Optionally, the access network device may alternatively be a small cell, a transmission reception point (TRP) (or may also be referred to as a transmission point), or the like. It may be understood that the access network device may alternatively be a base station in a future evolved public land mobile network (PLMN), or the like.

For example, the terminal device may also be referred to as user equipment (UE), a terminal, or the like. The terminal device is a device having a wireless transceiver function. The terminal device may be deployed on land, and includes an indoor device, an outdoor device, a handheld device, a wearable device, or a vehicle-mounted device. The terminal device may alternatively be deployed on the water, for example, on a ship. The terminal device may alternatively be deployed in the air, for example, deployed on an airplane, a balloon, or a satellite. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. It may be understood that the terminal device may alternatively be a terminal device in a future 6G network, a terminal device in a future evolved PLMN, or the like.

It may be understood that the terminal device shown in this application may include a vehicle (for example, an entire vehicle) in an internet of vehicles, and may include a vehicle-mounted device, a vehicle-mounted terminal, or the like in the internet of vehicles. A specific form of the terminal device applied to the internet of vehicles is not limited in this application.

For ease of description, the following describes the method in this application by using an example in which the terminal device is a UE.

For example, the core network device may include an access and mobility management function (AMF), a mobility management entity (MME), a user plane function (UPF), or the like. For example, to provide better and more comprehensive services for more industries, a network architecture is adjusted for a 5G network compared with that of a 4G network. For example, in the 5G network, a mobility management entity (MME) in the 4G network is split into a plurality of network elements (or may be referred to as network functions) including an access and mobility management function (AMF), a session management function (SMF), and the like. The AMF in this application is a control plane network function provided by a PLMN, and is responsible for access control and mobility management when the UE accesses the PLMN, for example, including functions such as mobility status management, temporary user identity allocation, and user authentication and authorization. Therefore, with development of a mobile network, even if the AMF or the UPF may evolve into another form, name, or the like, any AMF or UPF that can implement the method shown in this application falls within the protection scope of this application.

The communication system shown in FIG. 1 includes a base station, six UEs, such as a UE 1 to a UE 6 in FIG. 1, and a core network device. It may be understood that for specific descriptions of the UE, the base station, and the core network device, refer to the foregoing descriptions. Details are not described herein again.

In the communication system, the base station may send a downlink signal, for example, first indication information or a paging message, to each of the UE 1 to the UE 6, and each of the UE 1 to the UE 6 may send an uplink signal to the base station. It should be understood that FIG. 1 shows an example of communication links between one base station, six UEs, and a communication device. Optionally, the communication system may include a plurality of base stations, and a coverage area of each base station may include another quantity of UEs, for example, more or fewer UEs. This is not limited in this application.

Optionally, the communication system shown in FIG. 1 may further include a plurality of core network devices. For example, the plurality of core network devices may belong to different PLMNs. A quantity of core network devices is not limited in this application.

A quantity and the like of devices in the communication system shown in FIG. 1 is not limited in this application.

Terms included in this application are described below.

1. Multi-Card Terminal

A multi-card terminal is a terminal equipped with two or more telephone cards (SIM or USIM cards). For example, the telephone card includes a subscriber identification module (SIM) and/or a universal subscriber identity module (USIM). The multi-card terminal may separately register with different networks, for example, different access network devices and/or different core network devices, by using two or more telephone cards. Therefore, one telephone card corresponds to one UE, and a plurality of cards in a multi-card terminal may be understood as a plurality of UEs.

It may be understood that the method shown in this application is not only applicable to a terminal with one telephone card, but also applicable to a terminal with two or more telephone cards.

2. Paging Message

Generally, a UE in an idle state or an inactive state "wakes up" at a paging occasion (PO) of the UE to receive a paging message.

For example, at the PO of the UE, the UE first receives downlink control information (DCI) indicating the paging message. The DCI may indicate a time-frequency resource of the paging message. It may be understood that the DCI indicating the paging message may also be referred to as DCI scrambled by using a paging radio network temporary identifier (P-RNTI). Alternatively, the DCI indicating the paging message may also be referred to as paging control information, or the like for short. A specific name of the DCI is not limited in this application. Therefore, after receiving the DCI, the UE receives the paging message. If the paging message carries an identifier (ID) of the UE, it indicates that the UE is paged. The UE initiates an RRC connection establishment process to access a base station. If the paging message does not carry the ID of the UE, it indicates that the UE is not paged. The UE may continue to sleep and wait for a next PO to "wake up". It may be understood that the DCI may be transmitted on a physical downlink control channel (PDCCH), and the paging message may be transmitted on a physical downlink shared channel (PDSCH).

For example, a paging mechanism may further be specifically classified into core network (CN) paging and access network (RAN) paging. For example, the UE in the idle state corresponds to CN paging, and the UE in the inactive state corresponds to RAN paging. For another example, an ID used for paging the UE in the idle state may include an international mobile subscriber identity (IMSI) or a 5G S-temporary mobile subscription identifier (5G-S-TMSI). For another example, an ID used for paging the UE in the inactive state may include an inactive-radio network temporary identifier I-RNTI or a full I-RNTI (full I-RNTI). It may be understood that with evolution of the communication system, the paging message may include more UE identifiers, or an identifier used by the UE in the idle state may also change, or an identifier used by the UE in the inactive state may also change, or the like. This is not limited in this application. In this application, an ID of the UE used for paging corresponding to the core network device is collectively referred to as a first identifier of the UE. For example, the first identifier includes an IMSI, a 5G-S-TMSI, or the like. An ID of the UE used for paging corresponding to the access network device is collectively referred to as a second identifier of the UE. For example, the second identifier includes an I-RNTI or a fullI-RNTI. This description is also applicable in the following.

A same paging message may be used to page a plurality of UEs, and the plurality of UEs may include a UE in the idle state and/or a UE in the inactive state. For example, the paging message includes a paging record list, and the paging record list includes one or more (for example, a maximum of 32) "paging records". The paging record includes a "UE ID", and the UE ID may be a 5G-S-TMSI, a fullI-RNTI, or the like. One "paging record" may correspond to one UE. To be specific, if N UEs are paged by one paging message, the paging record list may include N paging records, for example, N is an integer less than or equal to 32. It may be understood that a value of N may change with evolution of the communication system. Therefore, a specific value of N is not limited in this application.

For example, some content of the paging message may be shown as follows:

```
paging message:
    paging record list (including four paging records)
        paging record: (1ˢᵗ)
            UE ID: 5G-S-TMSI
        paging record: (2ⁿᵈ)
            UE ID: fullI-RNTI
        paging record: (3ʳᵈ)
            UE ID: 5G-S-TMSI
        paging record: (4ᵗʰ)
            UE ID: fullI-RNTI
```

It may be understood that the content of the paging message shown above is merely an example. For specific content of the paging message, refer to a related standard or protocol. Details are not described herein.

3. Paging Cause Value

Through a UE ID or UE IDs carried in a paging message, a UE may know whether the UE is paged, but cannot know for which service the UE is paged. For example, currently, the UE may have a voice service (for example, a call), or may have a data service (for example, web page data and app data). For example, for a multi-card terminal, communication may be performed on only one card at a time. For example, the multi-card terminal currently performs communication by using a card 1, and a service reaches a card 2 (for example, a network device (including an access network device and/or a core network device) pages the card 2) at this time, the dual-card terminal may choose to disconnect communication of the card 1 and establish communication of the card 2. It may be understood that a specific manner in which the dual-card terminal disconnects the communication of the card 1 is not limited in this application. For a specific manner in which the dual-card terminal disconnects the communication of the card 1, refer to a related standard or protocol, or the like.

Usually, the UE only knows that a network pages the UE, but does not know a specific service type of paging. To avoid missing a service type with a high priority (which may also be referred to as a service priority), the UE first responds to paging. For example, after establishing the communication of the card 2, the multi-card terminal may find that a service type of the card 2 is not a service type of a high priority, but may be a service type of a lower priority. As a result, the communication of the card 1 is disconnected, and communication quality of the card 1 is affected.

In view of this, a "paging cause value" may be introduced into the paging message. For example, when the network device (including the access network device or the core network device) pages the UE, the network device may indicate a cause value for paging the UE. For example, the paging cause value may include a first service type and/or a second service type, and a priority of the first service type is different from a priority of the second service type. In this way, the multi-card terminal can determine a priority based on the "paging cause value", and select, for communication, a service that is with a higher priority and that more needs to be responded.

For example, a field indicating the paging cause value may be added (or introduced) to the paging message. In an optional embodiment, when the paging message does not include the field indicating the paging cause value, it may indicate that a cause for initiating paging by the network device is the first service type. In an optional embodiment, when the paging message includes the field indicating the paging cause value, it may indicate that a cause for initiating paging by the network device is the second service type.

For example, the paging message includes a paging record list, and the paging record list includes N paging records. For example, the paging message may be extended. For example, the paging message may further include an extended paging record list. For example, the extended paging record list includes one or more (for example, a maximum of 32) extended paging records, and the extended paging record may include or indicate a paging cause value. For example, if the paging record list includes N paging records, the extended paging record list may also include N extended paging records, to indicate a paging cause value corresponding to paging of each UE.

For example, the field indicating the paging cause value may be an optional field. If the paging message does not include the field, it indicates that the paging cause value is the first service type (which may also be referred to as that a paging service is the first service type). If the paging message includes the field, it indicates that the paging cause value is the second service type (which may also be referred to as that a paging service is the second service type). It may be understood that when the paging message includes the field, a specific value of the field is not limited in this application.

For example, the second service type may be a voice service, and the first service type may be a non-voice service, or the first service type may be another service except voice. For example, the second service type may be a voice service, and the first service type may be a data service. It may be understood that specific services of the first service type and the second service type are not limited in this application.

For example, some content of the paging message sent by the network device may be shown in Table 1.

TABLE 1

| Paging message: | Extended paging message: |
|---|---|
| Paging record list: (including four paging records) | Extended paging record list: (including four paging records) |
| Paging record: ($1^{st}$) | Extended paging record: ($1^{st}$) |
| UE ID: 5G-S-TMSI | Paging cause value field |
| paging record: ($2^{nd}$) | Extended paging record: ($2^{nd}$) |
| UE ID: fullI-RNTI | Paging cause value field |
| Paging record: ($3^{rd}$) | Extended paging record: ($3^{rd}$) |
| UE ID: 5G-S-TMSI | Paging cause value field |
| Paging record: ($4^{th}$) | Extended paging record: ($4^{th}$) |
| UE ID: fullI-RNTI | Paging cause value field |

According to the foregoing descriptions, after receiving the paging message, the UE may have the following understanding manners.

1. If no extended paging message exists, and/or no extended paging message record exists, it indicates that the network device does not support the paging cause value, and the UE responds to paging based on a case in which the paging cause value is not indicated. For example, communication of the card 1 may be disconnected, to respond to paging for the card 2 by the network device.

2. If the extended paging message exists, and/or the extended paging message record exists, it indicates that the network device supports the paging cause value, and the UE responds to paging based on the paging cause value carried in the extended paging record list. For example, the multi-card terminal chooses to disconnect the communication of the card 1 and establish the communication of the card 2, or chooses to maintain the communication of the card 1 and not establish the communication of the card 2. For another example, if a service priority corresponding to paging is higher than a priority of a currently ongoing service, the multi-card terminal may choose to disconnect the communication of the card 1 and establish the communication of the card 2. For another example, if a service priority corresponding to paging is lower than a priority of a currently ongoing service, the communication of the card 1 may be maintained and the communication of the card 2 is not established. For another example, when a service priority corresponding to paging is the same as a priority of a currently ongoing service, any one of the services may be randomly selected. For example, if the extended paging record list includes N extended paging records, and the "paging cause value" is indicated in an $M^{th}$ extended paging record, it indicates that the cause value of current paging is the second service type. If the "paging cause value" is not indicated in the $M^{th}$ extended paging record, it indicates that the cause value of current paging is the first service type.

However, not all network devices support adding, to the paging message, the field indicating the paging cause value. If some network devices do not support this mechanism, the field indicating the paging cause value does not exist in the paging message. In this case, the UE cannot accurately determine whether the paging cause value is not indicated or it indicates that a cause value of paging initiated by the network device is the first service type. As a result, the UE cannot correctly understand the paging message.

That is, based on the foregoing descriptions, the following cases may exist.

Case 1: If neither the access network device nor the core network device supports the "paging cause value", that is, no extended paging message exists, it indicates that the UE can respond to paging based on the case in which the "paging cause value" is not indicated.

Case 2: The access network device does not support the "paging cause value", but the core network device supports the "paging cause value". Because the paging message is sent by the access network device to the UE, even if the core network device supports the paging cause value, no extended paging message exists in the paging message sent by the access network device (no extended paging record list, no paging cause value, or the like exists in this case). Therefore, the UE may respond to paging based on the case in which the "paging cause value" is not indicated.

Case 3: Both the access network device and the core network device support the "paging cause value". In this case, the extended paging message exists. If the paging cause value field is not indicated in the extended paging message, it indicates that the cause value of current paging is the first service type (which may also be referred to as that a paging service is the first service type). If the extended paging message indicates the paging cause value field, it indicates that the cause value of current paging is the second service type (which may also be referred to as that a paging service is the second service type).

Case 4: The access network device supports the "paging cause value", but the core network device does not support the "paging cause value". In this case, the "paging cause value" is not indicated in paging initiated by the core network device, and the "paging cause value" is indicated in paging initiated by the access network device. Because the paging message is sent by the access network device to the UE (that is, the paging message is generated by the access network device), the extended paging message may exist. For example, if paging includes paging initiated by the access network device, the paging message includes an extended paging message. In this case, if this paging further includes paging initiated by the core network device, the paging message also includes the extended paging message and/or the extended paging record. However, the extended paging message does not indicate the "paging cause value". For example, Table 2 shows an example of some content of the paging message. For example, the extended paging message, the extended paging record list, the extended paging record, and the paging cause value field may be shown in Table 2. For example, for the $1^{st}$ paging record and the $3^{rd}$ paging record, in the corresponding extended paging message, the extended paging records exist, but no paging cause value exists. In the foregoing cases, because the extended paging message and/or the extended paging record list exists, but no paging cause value exists, the UE may misunderstand that the cause value of current paging is the first service type.

Therefore, it should be indicated that the network device does not support the "paging cause value". However, because the UE misunderstands that the cause value of current paging is the first service type, the UE may consider that the priority of the first service type is low, and therefore does not respond to paging. However, when a cause value of paging initiated by the core network device is the second service type, the UE incorrectly does not respond to the second service type with a high priority, thereby affecting user experience.

TABLE 2

| Paging message: | Extended paging message: |
|---|---|
| Paging record list (including four paging records) | Extended paging record list: (including four paging records) |
| Paging record: ($1^{st}$) | Extended paging record: (no paging cause value) |
| UE ID: 5G-S-TMSI | The paging cause value field is not included |
| Paging record: ($2^{nd}$) | Extended paging record: (the cause value is voice) |
| UE ID: fullI-RNTI | The paging cause value field is included |
| Paging record: ($3^{rd}$) | Extended paging record: (no paging cause value) |
| UE ID: 5G-S-TMSI | The paging cause value field is not included |
| Paging record: ($4^{th}$) | Extended paging record: (the cause value is non-voice) |
| UE ID: fullI-RNTI | The paging cause value field is not included |

It may be understood that the ID included in the paging message may be a UE in a cell. If POs of a plurality of UEs in a cell are the same, the base station may simultaneously initiate paging to the plurality of UEs in one paging message.

It may be understood that although Table 2 shows the paging message and the extended paging message, both the paging message and the extended paging message are included in the paging message sent by the access network device. Therefore, the paging message and the extended paging message are collectively referred to as paging messages in this application. This description is also applicable to the following in this application.

For example, some content of the paging message may alternatively be shown in Table 3.

TABLE 3

| Paging message: | Extended paging message: |
|---|---|
| Paging record list: (including four paging records) | Extended paging record list: (including four paging records) |
| UE ID: 5G-S-TMSI | The paging cause value field is not included |
| UE ID: fullI-RNTI | The paging cause value field is included |
| UE ID: 5G-S-TMSI | The paging cause value field is not included |
| UE ID: fullI-RNTI | The paging cause value field is not included |

For example, some content of the paging message may alternatively be shown in Table 4.

TABLE 4

| Some paging messages: | Other paging messages: |
|---|---|
| Paging record list: (including four paging records) | Extended paging record list: (including four paging records) |
| UE ID: 5G-S-TMSI | The paging cause value field is not included |
| UE ID: fullI-RNTI | The paging cause value field is included |
| UE ID: 5G-S-TMSI | The paging cause value field is not included |
| UE ID: fullI-RNTI | The paging cause value field is not included |

For example, some content of the paging message may alternatively be shown in Table 5.

TABLE 5

| Some paging messages: | Other paging messages: |
|---|---|
| UE ID: 5G-S-TMSI | The paging cause value field is not included |

TABLE 5-continued

| UE ID: fullI-RNTI | The paging cause value field is included |
|---|---|
| UE ID: 5G-S-TMSI | The paging cause value field is not included |
| UE ID: fullI-RNTI | The paging cause value field is not included |

It may be understood that the paging message shown in Table 2 to Table 5 may be understood as: The paging record of the UE and the extended paging record of the UE may be separately included in different fields. However, information about each UE in the paging record list is in a one-to-one correspondence with information about each UE in the extended paging record list. To be specific, a quantity of paging records in the paging record list is the same as a quantity of extended paging records in the extended paging record list. If information included in the paging record list respectively corresponds to the UE 1, the UE 2, the UE 3, and the UE 4, information included in the extended paging record list respectively corresponds to the UE 1, the UE 2, the UE 3, and the UE 4. For example, the paging message may successively include an ID of the UE 1, an ID of the UE 2, an ID of the UE 3, and an ID of the UE 4, and sequentially include a paging cause value field corresponding to the UE 1, a paging cause value field corresponding to the UE 2, a paging cause value field corresponding to the UE 3, and a paging cause value field corresponding to the UE 4. It may be understood that if the paging cause value field corresponding to the UE 1 does not exist, the UE 1 may determine the paging cause value field corresponding to the UE 1 based on the extended paging record. Alternatively, for a method for determining, by the UE, the paging cause value field corresponding to the UE, refer to a related standard or protocol. This is not limited in this application.

For example, some content of the paging message may alternatively be shown in Table 6.

TABLE 6

```
Paging message:
    Paging record list: (including four paging records)
        Paging record: (1st)
            UE ID: 5G-S-TMSI
            The paging cause value field is not included
        Paging record: (2nd)
            UE ID: fullI-RNTI
            The paging cause value field is included
        Paging record: (3rd)
            UE ID: 5G-S-TMSI
            The paging cause value field is not included
        Paging record: (4th)
            UE ID: fullI-RNTI
            The paging cause value field is not included
```

It may be understood that the paging message shown in Table 6 may be understood as: A same paging record includes the ID of the UE and the paging cause value field corresponding to the UE. To be specific, all information corresponding to the UE may be included in the paging record list. For example, the paging message successively includes an ID of the UE 1, a paging cause value field corresponding to the UE 1, an ID of the UE 2, a paging cause value field corresponding to the UE 2, an ID of the UE 3, a paging cause value field corresponding to the UE 3, an ID of the UE 4, and a paging cause value field corresponding to the UE 4.

It may be understood that the content of the paging message shown above is merely an example, and a specific format of the paging message is not limited in this application. The examples of the content of the paging message shown in Table 2 to Table 6 are also applicable to the following. Details are not described in detail below in this application.

In view of this, this application provides a paging indication method and an apparatus, so that a UE can correctly understand a paging message, thereby improving user experience.

Before the method provided in this application is described, the following first describes in detail first indication information and second indication information in this application.

The first indication information is as follows.

The first indication information shown in this application indicates whether a core network device supports a paging cause value. Optionally, the first indication information may alternatively be understood as follows: The first indication information indicates whether a core network device sets (or, configures) a paging cause value, or the first indication information indicates whether a paging cause value is indicated in paging corresponding to a core network device, or the first indication information indicates whether a paging cause value is indicated in paging that is in a paging message (including a first paging message) and that corresponds to a first identifier of a UE, or the first indication information indicates whether a paging cause value is included in paging corresponding to a core network device, or the first indication information indicates whether paging that is in a paging message (including a first paging message) and that corresponds to a first identifier of a UE includes a paging cause value, or the first indication information indicates whether a core network device supports adding a paging cause value to a paging message (including a first paging message), or the first indication information indicates whether a core network device supports indicating or configuring a paging cause value in a paging message (including a first paging message).

The foregoing descriptions about the first indication information are merely examples. The first indication information may be described in another form. Details are not described herein. Descriptions of the first indication information fall within the protection scope of this application as long as they are included in the foregoing meaning.

That corresponding paging shown in this application includes the paging cause value may be understood as whether corresponding paging explicitly includes the paging cause value, and whether corresponding paging implicitly indicates or includes the paging cause value.

Optionally, the first indication information indicates whether a core network device corresponding to a PLMN supports the paging cause value. To be specific, one core network device belongs to one PLMN, and the PLMN may be a PLMN serving a UE.

Optionally, the first indication information indicates whether core network devices corresponding to a plurality of PLMNs support the paging cause value.

For example, in a RAN sharing scenario, one access network device may be connected to a plurality of core network devices. In this case, different core network devices may belong to different PLMNs. Therefore, the first indication information may be information corresponding to the plurality of PLMNs.

In this case, for example, the first indication information may include information indicating an identifier of the PLMN. For example, a core network device corresponding to one PLMN corresponds to one piece of indication information (namely, indication information indicating whether a paging cause value is supported). For another example, there are only two cases of whether the paging cause value is supported. Therefore, some of the plurality of PLMNs may correspond to one piece of indication information, and the other PLMNs may correspond to one piece of indication information. For example, the first indication information is a list, and the list includes information corresponding to one or more PLMNs. For example, the information corresponding to the PLMN includes indication information of a core network device corresponding to the PLMN.

For example, a format of the list may be shown in Table 7.

TABLE 7

| Identifier of a PLMN 1 | The paging cause value is supported |
| Identifier of a PLMN 2 | The paging cause value is not supported |
| Identifier of a PLMN 3 | The paging cause value is supported |

The list shown in Table 7 may be understood as that the list sequentially includes the identifier of each PLMN, and then includes the indication information of a core network device corresponding to each PLMN.

For example, a format of the list may be shown in Table 8.

TABLE 8

| Identifier of a PLMN 1 The paging cause value is supported |
| Identifier of a PLMN 2 The paging cause value is not supported |
| Identifier of a PLMN 3 The paging cause value is supported |

The list shown in Table 8 may be understood as that the list successively includes the identifier of the PLMN 1, the indication information of a core network device correspond-
ing to the PLMN 1, the identifier of the PLMN 2, the
indication information of a core network device correspond-
ing to the PLMN 2, the identifier of the PLMN 3, and the
indication information of a core network device correspond-
ing to the PLMN 3.

It may be understood that, in the foregoing case, when the
UE obtains the first indication information, the UE may
determine whether a core network device corresponding to
a first PLMN supports the paging cause value, where the first
PLMN is a PLMN serving the UE. In other words, the UE
may obtain, from the first indication information based on an
identifier of the first PLMN serving the UE, whether the core
network device corresponding to the first PLMN supports
the paging cause value. For a method for obtaining the
identifier of the first PLMN by the UE, refer to a related
standard or protocol, or the like. This is not limited in this
application.

The second indication information is as follows.

The second indication information shown in this applica-
tion indicates whether an access network device supports a
paging cause value. Optionally, the second indication infor-
mation may alternatively be understood as follows: The
second indication information indicates whether an access
network device sets (or, configures) a paging cause value, or
the second indication information indicates whether a pag-
ing cause value is indicated in paging corresponding to an
access network device, or the second indication information
indicates whether a paging cause value is indicated in paging
that is in a paging message (including a first paging mes-
sage) and that corresponds to a second identifier of a UE, or
the second indication information indicates whether a pag-
ing cause value is included in paging corresponding to an
access network device, or the second indication information
indicates whether paging that is in a paging message (includ-
ing a first paging message) and that corresponds to a second
identifier of a UE includes a paging cause value, or the
second indication information indicates whether an access
network device supports adding a paging cause value to a
paging message (including a first paging message), or the
second indication information indicates whether an access
network device supports indicating or configuring a paging
cause value in a paging message (including a first paging
message).

The foregoing descriptions about the second indication
information are merely examples. The second indication
information may be described in another form. Details are
not described herein. Descriptions of the second indication
information fall within the protection scope of this applica-
tion as long as they are included in the foregoing meaning.

It may be understood that for descriptions of the first
identifier and the second identifier, refer to the foregoing
descriptions. Details are not described herein again.

A relationship between the first indication information
and the second indication information may be shown as
follows.

For example, the first indication information and the
second indication information may be included in different
messages. For example, the first indication information is
included in a third field of a first NAS message, and the
second indication information is included in a fourth field of
a second NAS message. For another example, the first
indication information is included in a NAS message, and
the second indication information is included in an SIB. In
this application, for a message that includes the first indication information and a message that includes the second
indication information, refer to the following. Details are not
described herein.

For example, the first indication information and the
second indication information may be included in a same
message. For example, an SIB includes a third field and a
fourth field, the third field is used to carry the first indication
information, and the fourth field is used to carry the second
indication information. For another example, an SIB
includes a fifth field, a bit length of the fifth field is 2 bits,
one bit is used to carry the first indication information, and
the other bit indicates the second indication information. It
may be understood that when the fifth field carries the first
indication information and the second indication informa-
tion, the foregoing descriptions of the fifth field may alter-
natively be understood as follows: A first subfield of the fifth
field is used to carry the first indication information, and a
second subfield of the fifth field is used to carry the second
indication information.

It may be understood that, for ease of description, the
following describes the method provided in this application
by using an example in which the first indication informa-
tion is carried in the third field and the second indication
information is carried in the fourth field. However, a rela-
tionship between the first indication information and the
third field and a relationship between the second indication
information and the fourth field are also applicable to a
relationship between the first indication information, the
second indication information, and the fifth field. For
example, for a relationship between the first indication
information and the first subfield of the fifth field, refer to the
relationship between the first indication information and the
third field. For another example, for a relationship between
the second indication information and the second subfield of
the fifth field, refer to the relationship between the second
indication information and the fourth field.

The relationship between the first indication information
and the third field may be shown as follows.

For example, the first indication information is carried in
the third field. When the third field does not exist, the first
indication information indicates that the core network device
does not support the paging cause value. When the third field
exists, the first indication information indicates that the core
network device supports the paging cause value. To be
specific, whether the core network device supports the
paging cause value may be indicated based on whether the
third field exists. If the third field does not exist, it indicates
that the core network device does not support the paging
cause value. If the third field exists, it indicates that the core
network device supports the paging cause value. When the
third field exists, a value of the third field is not limited in
this application. It may be understood that the manner shown
above is merely an example. If the third field does not exist,
it may indicate that the core network device supports the
paging cause value. When the third field exists, it indicates
that the core network device does not support the paging
cause value. It may be understood that when the third field
exists, the specific value of the third field is not limited in
this application.

For example, when the value of the third field is a first
value, the first indication information indicates that the core
network device supports the paging cause value, or when the
value of the third field is a second value, the first indication
information indicates that the core network device does not
support the paging cause value. For example, the third field
is a 1-bit field, that is, the value of the third field is 1 or 0.
For example, when the value of the third field is 1 (the first value), it indicates that the core network device supports the paging cause value. For another example, when the value of the third field is 0 (the second value), it indicates that the core network device does not support the paging cause value. It may be understood that the foregoing value is merely an example, and should not be construed as a limitation on this application. It may be understood that a bit length of the third field may alternatively be 2 bits, or the like. This is not limited in this application.

The relationship between the second indication information and the fourth field may be shown as follows.

For example, the second indication information is carried in the fourth field. When the fourth field does not exist, the second indication information indicates that the access network device does not support the paging cause value. When the fourth field exists, the second indication information indicates that the access network device supports the paging cause value.

For example, when a value of the fourth field is a third value, the second indication information indicates that the access network device supports the paging cause value, or when a value of the fourth field is a fourth value, the second indication information indicates that the access network device does not support the paging cause value.

It may be understood that the first value shown above may be equal to the third value, or the first value shown above may not be equal to the third value. In addition, the second value may be equal to the fourth value, or the second value may not be equal to the fourth value. This is not limited in this application.

It may be understood that for descriptions of the third indication information and the fourth field, refer to the descriptions of the first indication information and the third field. Details are not described herein again.

FIG. 2 is a schematic flowchart of a paging indication method according to an embodiment of this application. As shown in FIG. 2, the method includes the following steps.

201: A UE obtains first indication information, where the first indication information indicates whether a core network device supports a paging cause value.

A method for obtaining the first indication information by the UE may include the following manners.

Manner 1: Obtain the first indication information from a first paging message.

For Manner 1, step 201 and step 202 in this embodiment of this application may be replaced by the following: A base station sends the first paging message to the UE, and the UE receives the first paging message, and obtains the first indication information from the first paging message. For example, the first indication information is included in a third field of the first paging message.

Manner 2: Obtain the first indication information from DCI used to schedule a first paging message.

Usually, the DCI may indicate a time-frequency resource of the first paging message, so that the UE receives the first paging message based on the time-frequency resource indicated by the DCI. Therefore, the DCI may include the first indication information, and the first indication information is included in a third field of the DCI. The DCI used to schedule the first paging message may also be referred to as DCI scrambled by using a P-RNTI, paging control information, or the like. This is not limited in embodiments of this application.

For example, for Manner 1 and Manner 2, when paging initiated by the core network device (CN paging for short) and paging initiated by the base station (RAN paging for short) coexist in the first paging message, the UE obtains the first indication information from the first paging message or the DCI. To be specific, when CN paging and RAN paging coexist in the first paging message, the base station may set the first indication information in the DCI or the first paging message. In this case, the UE needs to parse the first indication information. For example, the first indication information indicates, based on whether the first indication information exists, whether a CN supports the "paging cause value". For example, when CN paging and RAN paging do not coexist, a base station may not set the first indication information in the DCI or the paging message. In this case, the UE does not need to parse the first indication information.

Manner 3: Obtain the first indication information from a NAS message.

If the core network device sends the NAS message to the UE, correspondingly, the UE receives the NAS message, where the NAS message includes the first indication information. For example, the NAS message may be sent by the core network device to a base station, and then sent by the base station to the UE.

For example, when the UE is powered on, or performs location update, or re-accesses a network, the UE performs a registration procedure, so that the UE obtains an allowed network slice. For example, the UE sends a registration request message to the core network device, and the core network device receives the registration request message. The core network device sends a registration accept message to the UE, and the UE receives the registration accept message, where the registration accept message includes identification information of the allowed network slice. It may be understood that time at which the UE performs the registration procedure is not limited in embodiments of this application.

Optionally, the registration accept message further includes the first indication information. Whether the core network device supports the paging cause value is indicated by the first indication information included in the registration accept message. For example, the first indication information may be carried in a third field of the registration accept message. Optionally, the registration request message includes request information used to request whether the core network device supports the paging cause value. Therefore, the core network device includes the first indication information in the registration accept message based on the request information. For example, the first indication information is carried in the third field. Optionally, the registration request message includes information indicating whether the UE supports the paging cause value. For example, if the registration request message includes information indicating that the UE supports the paging cause value, the core network device may return the first indication information to the UE based on the information. It may be understood that, if the registration request message includes information indicating that the UE does not support the paging cause value, the UE cannot correctly interpret paging corresponding to the core network device regardless of whether the core network device supports the paging cause value. In this case, the core network device may not feed back the first indication information.

Manner 4: Obtain the first indication information from an SIB.

For example, a base station sends the SIB to the UE, and the UE receives the SIB to obtain the first indication information. Optionally, the base station receives third indication information from the core network device, where the third indication information indicates whether the core network device supports the paging cause value. The base station obtains the first indication information based on the third indication information. For descriptions of the third indication information, refer to the foregoing descriptions of the first indication information. Details are not described herein again. Optionally, the base station obtains the first information from an OAM device. For example, the OAM device may configure the first indication information for the base station. Optionally, the base station receives a second paging message from the core network device, and obtains the first indication information based on a first field included in the second paging message. In other words, the base station may obtain the first indication information in a self-learning manner. To be specific, the base station receives paging corresponding to the core network device, and paging corresponding to the core network device indicates the "paging cause value". Therefore, the base station may learn that the core network device supports the "paging cause value", and obtain the first indication information. For example, the first indication information is carried in a third field of the SIB.

It may be understood that a specific SIB in which the first indication information is included is not limited in this application. For example, the first indication information may be included in an SIB 1, an SIB 2, an SIB 3, or the like. Details are not described herein.

For Manner 3 and Manner 4, the UE may obtain the first indication information before receiving the first paging message, so that efficiency of parsing the first paging message by the UE can be effectively ensured.

It may be understood that for descriptions of the first indication information, refer to the foregoing descriptions. Details are not described herein again.

203: The base station sends the first paging message to the UE, and correspondingly, the UE receives the first paging message, where the first paging message includes first information corresponding to the UE.

In this embodiment of this application, the first information corresponds to paging initiated by the core network device. For example, the UE may be a UE in an idle state, and the first information includes a first identifier of the UE, for example, an IMSI or a 5G-S-TMSI. In other words, the UE is a UE that receives CN paging in the idle state, that is, a UE whose UE ID included in the first paging message corresponds to the 5G-S-TMSI. If the UE is a UE that receives RAN paging in an inactive state, the first indication information may be ignored, and how to correctly parse the "paging cause value" in the first paging message is determined directly based on whether a second field (for example, an extended paging message field and/or an extended paging record list field) exists.

For example, Table 2 to Table 6 are used as examples. The first information may be information corresponding to the UE in extended paging messages shown in Table 2 to Table 5. Alternatively, the first information may be all information corresponding to the UE shown in Table 2 to Table 6, for example, including an identifier of the UE.

The following describes in detail the method provided in an embodiment of this application based on an example of whether the first information includes a first field and whether the first paging message includes the second field.

For example, the first field shown in this embodiment of this application may also be referred to as a paging cause value field, a service type field, or the like. A specific name of the first field is not limited in embodiments of this application. The first field may be referred to as a paging cause value field because the first field may indicate the paging cause value. The first field may be referred to as a service type field because the paging cause value indicated by the first field may be a first service type, a second service type, or the like.

For example, the second field may also be referred to as an extended paging message field, an extended paging record list field, or the like. A specific name of the second field is not limited in embodiments of this application. Alternatively, the second field may be understood as a first field corresponding to each UE included in the first paging message. In other words, the first field corresponding to each UE may be understood as a subfield of the second field.

It should be understood that the first field may be included in the first information, and the second field is included in the first paging message. To be specific, the first information is distinguished by different UEs, and the first field is information corresponding to the UE. The second field may include information of a plurality of UEs. For example, the second field may include a part or all information in the first information. For another example, it may be referred to as that the second field includes extension information of a plurality of UEs, and the extension information may include extended paging record lists or extended paging messages shown in Table 2 to Table 6. For another example, the second field may include a paging cause value indicated by an access network device to a UE 1, a paging cause value indicated by the access network device to a UE 2, a paging cause value indicated by the core network device to a UE 3, and the like. Examples are not provided herein.

For example, when the first paging message includes first information corresponding to a plurality of UEs and the second field, for example, one UE corresponds to one piece of first information, a correspondence between the first information and the UE and a correspondence between the second field and the UE may be shown in Table 2 to Table 6. For example, if the first paging message includes first information corresponding to the UE 1, first information corresponding to the UE 2, and first information corresponding to the UE 3, the second field may sequentially include extension information corresponding to the UE 1, extension information corresponding to the UE 2, and extension information corresponding to the UE 3.

The following describes the method provided in an embodiment of this application from different implementations.

Implementation 1

The first information does not include the first field indicating the paging cause value.

When the first information does not include the first field indicating the paging cause value, there may be the following two cases.

Case 1: When the first indication information indicates that the core network device supports the paging cause value, the first information indicates the paging cause value.

For example, that the first information indicates the paging cause value may alternatively be understood as follows: The first information indicates the paging cause value, or indicates the paging cause value in paging corresponding to the core network device, or the paging cause value and the like are set in paging corresponding to the core network device (refer to the related descriptions of the first indication information). In other words, although the first information does not explicitly include the first field indicating the paging cause value, it may be learned, based on the first indication information, that the first information implicitly indicates the paging cause value. In other words, the terminal device may determine, based on the first indication information, that the core network device indicates the paging cause value.

For example, the paging cause value may be a first service type, or a service corresponding to the first information may be referred to as a first service type. In other words, in the foregoing case, the paging cause value indicated by the first information is the first service type. To be specific, a paging cause for initiating corresponding paging by the core network device is that the first service type arrives, and therefore paging is triggered. For example, the first service type may be a non-voice service, a data service, or the like. The first service type is not limited in embodiments of this application. As long as a priority of the first service type is lower than a priority of the second service type, regardless of a service belongs to the first service type or the second service type, the service falls within the protection scope of embodiments of this application. For descriptions of the first service type and the second service type, refer to the foregoing descriptions. Details are not described herein again.

Case 2: When the first indication information indicates that the core network device does not support the paging cause value, the first information does not indicate the paging cause value.

In the foregoing case, the UE may explicitly learn, based on the first indication information, that the first information does not indicate the paging cause value. Therefore, the UE may choose, in a manner in which the paging cause value is not indicated, whether to respond to paging.

Implementation 2

The first paging message includes the second field indicating the paging cause value.

Optionally, the first paging message further includes second information, and the second information corresponds to paging initiated by the base station. With reference to the foregoing Implementation 1, the first field and the second field may be understood as follows: The first paging message includes the first information and the second information, the first information corresponds to paging initiated by the core network device, and the second information corresponds to paging initiated by the base station. The first paging message includes the second field. When the first information includes the first field, the first field may be included in the second field. For example, the second field includes a part or all information of the first information, and further includes a part or all information of the second information. In other words, the first paging message includes paging corresponding to the core network device (which may also be referred to as CN paging), and paging corresponding to the base station (which may also be referred to as RAN paging). In this case, if the base station supports the paging cause value, but the core network device does not support the paging cause value, the first paging message includes the second field. For the UE, the first information does not include the first field.

For example, when the first paging message includes the second field but does not include the first field, it may be further understood follows: Although the core network device does not support adding a paging cause value field to paging initiated by the core network device, because the first paging message is generated by the base station and sent to the UE by the base station, the base station generates the first paging message with reference to whether the base station supports the paging cause value. For example, the base station enables, with reference to a case in which the base station supports the paging cause value, the generated first paging message to include the second field. However, because the core network device does not support the paging cause value, the second field may not include the first field corresponding to the UE. Based on the first indication information, the UE can correctly understand the first field by avoiding misunderstanding that the core network device supports the paging cause value and that the paging cause value is the first service type.

For example, as shown in Table 2, the second field may be an extended paging message, an extended paging record list, or the like shown above, and the first field is a paging cause value field shown above. For example, for example, the first paging message includes an extended paging record list (the second field), and the extended paging record list includes CN paging (for example, the first information) and RAN paging (for example, the second information), CN paging corresponds to a case in which the paging cause value field (the first field) is not included, and RAN paging corresponds to a case in which the paging cause value field is included. It may be understood that specific names of the first field and the second field are not limited in embodiments of this application.

Implementation 3

When the first information includes the first field indicating the paging cause value, the first information indicates the second service type. For example, the second service type may be a voice service, that is, the paging cause value indicated by the first information is the second service type. In this implementation, the UE may more accurately learn, with reference to the first indication information and the first field, whether the paging cause value is set for paging initiated by the core network device.

For example, for the UE, the foregoing three implementations may further be described as follows.

Behavior in which the UE receives the first paging message and correctly parses the "paging cause value" in the first paging message is as follows.

1. The UE receives the first indication information (only for example), and indicates that the CN supports the "paging cause value". When the first paging message includes the second field (which may also be referred to as that an extended paging message or an extended paging record list exists):

(1) If paging (namely, the first information shown above) corresponding to the CN includes the "paging cause value" (or a paging cause value is indicated in paging corresponding to the CN), the UE considers that the paging cause value of current paging is the second service type (for example, a voice service), and the UE responds to paging based on the second service type, for example, the UE responds to paging based on the second service type and a priority of a current service; or (2) if paging corresponding to the CN does not include the "paging cause value", the UE considers that the paging cause value of current paging is the first service type (for example, a non-voice service), and the UE responds to paging based on the first service type. For example, the UE responds to the paging based on the first service type and the priority of the current service.

2. The UE receives the first indication information (only for example), and indicates that the CN does not support the "paging cause value". When the first paging message includes the second field (which may also be referred to as that an extended paging message or an extended paging record list exists):

(1) A case in which paging corresponding to the CN includes the first field does not occur; or (2) if paging corresponding to the CN does not include the paging cause value, the UE considers that the paging cause value of current paging is not set, and the UE responds to paging based on a case in which the paging cause value is not indicated.

It may be understood that for descriptions of responding to paging, refer to the foregoing descriptions. Details are not described herein again.

In a possible implementation, step 201 and step 203 may be alternatively replaced by the following:

A base station sends a first paging message to a UE, and the UE receives the first paging message, where the first paging message includes first information corresponding to the UE. When the first information does not include a first field, and first indication information exists, a paging cause value is determined based on the first information (or the first indication information).

That a paging cause value is determined based on the first information means that if the first indication information indicates that a core network device supports the paging cause value, the UE determines, based on the first information, that the paging cause value is a first service type, or if the first indication information indicates that a core network device does not support the paging cause value, the UE determines, based on the first information, that the paging cause value is not indicated, or that the paging cause value is not set in paging (namely, the first information) corresponding to the core network device.

Optionally, when the first information includes a first field, it is determined, based on the first information, that a paging cause value is a second service type. It may be understood that for specific descriptions of the foregoing replacement method, refer to the foregoing descriptions. Details are not described herein.

In a possible implementation, the method shown in FIG. 2 may further include the following step.

202: The UE obtains second indication information, where the second indication information indicates whether the base station supports the paging cause value.

For example, when the second indication information indicates that the base station supports the paging cause value, the first paging message includes the second field. However, if the second indication information indicates that the base station does not support the paging cause value, it indicates that the first paging message does not include the second field, and does not include the first field.

It may be understood that the second indication information shown above is merely an example. For example, the base station may not send the second indication information to the UE. In this case, the UE may consider by default that the base station supports the paging cause value.

It may be understood that if the first paging message does not include paging initiated by the base station, the first paging message does not include the second field. If the first paging message does not include paging initiated by the core network device, the base station may generate the first paging message based on whether the base station supports the paging cause value. For example, if the base station does not support the paging cause value, a format of the first paging message may be the same as that described in the foregoing descriptions of the paging message. For example, if the base station supports the paging cause value, the first paging message includes the second field.

It may be understood that although the foregoing method is numbered in sequence from step 201 to step 203, the foregoing numbers do not represent a performing sequence of an embodiment of this application. For example, the UE may obtain the first indication information and the second indication information at the same time. For example, the UE may alternatively first obtain the first indication information, and then obtain the second indication information. For example, the UE may receive the first paging message, where the first paging message includes both the first indication information and the second indication information. For example, the UE may first obtain the second indication information, and then receive the first paging message, where the first paging message includes the first indication information. For example, the UE may first obtain the first indication information, then receive the first paging message, and then obtain the second indication information, and the like. Details are not described herein.

In the technical solutions provided in embodiments of this application, because the first indication information may indicate whether the core network device supports the paging cause value, when the first indication information indicates that the core network device supports the paging cause value, even if the first information does not include the first field, the terminal device can obtain the paging cause value indicated in the first information. Therefore, the terminal device can correctly understand the first information, and the terminal device can clearly learn whether the paging cause value is indicated in the paging message, thereby improving user experience.

In addition, embodiments of this application further provide the following two solutions, so that the UE can explicitly learn content indicated by the paging message.

Solution 1: When the base station determines that the core network device does not support the paging cause value, regardless of whether the base station supports the paging cause value, the first paging message may not be generated by adding the paging cause value to the paging message. In this case, the UE may consider that the network device does not support the paging cause value.

In other words, if the RAN determines that the CN does not support the "paging cause value", the RAN does not use a feature of the "paging cause value". In this case, no extended paging message exists in the first paging message, and the UE considers that the network device does not support the "paging cause value".

For example, the first paging message includes paging initiated by the core network device and paging initiated by the base station. For example, the first paging message includes paging initiated by the core network device.

Solution 2: The third paging message corresponds to paging initiated by the core network device, and the fourth paging message corresponds to paging initiated by the base station. In other words, in a same PO, when both the core network device and the base station need to initiate paging, that is, when both CN paging and RAN paging exist, CN paging and RAN paging may be sent in two different paging messages. One of the paging messages includes only CN paging. If the paging message does not include an extended paging message, it indicates that CN paging does not support the "paging cause value". The other paging message includes only RAN paging. If the paging message includes an extended paging message, it indicates that RAN paging supports the "paging cause value".

The following describes communication apparatuses provided in embodiments of this application.

In this application, the communication apparatus is divided into function modules based on the foregoing method examples. For example, function modules corresponding to functions may be obtained through division, or two or more functions may be integrated into one processing module. The foregoing integrated module may be implemented in a form of hardware, or may be implemented in a form of a software function module. It should be noted that, in this application, module division is an example, and is merely a logical function division. In actual implementation, another division manner may be used. The following describes in detail communication apparatuses in embodiments of this application with reference to FIG. 3 to FIG. 5.

FIG. 3 is a schematic diagram of a structure of a communication apparatus according to an embodiment of this application. As shown in FIG. 3, the communication apparatus includes a processing unit 301 and a transceiver unit 302.

In some embodiments of this application, the communication apparatus may be the terminal device shown above, a chip in the terminal device, or the like. In other words, the communication apparatus may be configured to perform steps, functions, or the like performed by the terminal device or the UE in the foregoing method embodiments.

The processing unit 301 is configured to obtain first indication information, where the first indication information indicates whether a core network device supports a paging cause value.

The transceiver unit 302 is configured to input a first paging message, where the first paging message includes first information corresponding to the communication apparatus, and when the first information does not include a first field indicating the paging cause value, or when the first indication information indicates that the core network device supports the paging cause value, the first information indicates the paging cause value.

It may be understood that, that the processing unit 301 is configured to obtain the first indication information may alternatively be understood as follows: The processing unit 301 obtains the first indication information by using the transceiver unit 302. For example, the transceiver unit 302 is configured to: input the first indication information, and then input the first indication information to the processing unit 301. For another example, the processing unit 301 obtains the first indication information from the first paging message input by the transceiver unit 302 or DCI used to schedule the first paging message.

In a possible implementation, when the first indication information indicates that the core network device does not support the paging cause value, the first information does not indicate the paging cause value.

In a possible implementation, when the first information includes a first field, the first information indicates a second service type (for example, a voice service).

In a possible implementation, the first indication information indicates whether the core network device corresponding to a public land mobile network PLMN supports the paging cause value, or the first indication information indicates whether the core network devices corresponding to a plurality of PLMNs support the paging cause value.

In a possible implementation, different core network devices belong to different public land mobile networks PLMNs).

The processing unit 301 is further configured to determine, based on the first indication information, whether a core network device corresponding to a first public land mobile network PLMN supports the paging cause value, where the first PLMN is a PLMN serving the communication apparatus.

In a possible implementation, the first paging message includes a second field indicating the paging cause value. When the first information includes the first field, the first field is included in the second field.

In a possible implementation, the method further includes:

The processing unit 301 is further configured to obtain second indication information, where the second indication information indicates whether an access network device supports the paging cause value.

It may be understood that when the processing unit 301 is configured to obtain the second indication information, for specific descriptions of the processing unit 301 and the transceiver unit 302, refer to the descriptions of the processing unit configured to obtain the first indication information. Details are not described herein again.

In a possible implementation, when the second indication information indicates that the access network device supports the paging cause value, the first paging message includes the second field indicating the paging cause value. When the first information includes the first field, the first field is included in the second field.

In a possible implementation, the first paging message further includes second information, and the second information corresponds to paging initiated by the access network device.

In a possible implementation, the first indication information is included in any one of the following messages:

a non-access stratum NAS message, a system information block SIB, the first paging message, or the downlink control information DCI used to schedule the first paging message.

In a possible implementation, the first indication information is carried in a third field. When the third field does not exist, the first indication information indicates that the core network device does not support the paging cause value. When the third field exists, the first indication information indicates that the core network device supports the paging cause value. In a possible implementation, when a value of the third field is a first value, the first indication information indicates that the core network device supports the paging cause value, or when a value of the third field is a second value, the first indication information indicates that the core network device does not support the paging cause value.

In a possible implementation, the second indication information is carried in a fourth field. When the fourth field does not exist, the second indication information indicates that the access network device does not support the paging cause value. When the fourth field exists, the second indication information indicates that the access network device supports the paging cause value.

In a possible implementation, when a value of the fourth field is a third value, the second indication information indicates that the access network device supports the paging cause value, or when a value of the fourth field is a fourth value, the second indication information indicates that the access network device does not support the paging cause value.

In this embodiment of this application, for descriptions of the first paging message, the first information, the first field, the second field, the second indication information, the third field, or the fourth field, refer to the descriptions in the foregoing method embodiments. Details are not described herein again.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the processing unit 301 may be further configured to perform step 201 and step 202 shown in FIG. 2, and the transceiver unit 302 may be further configured to perform the receiving step in step 203 shown in FIG. 2.

FIG. 3 is still used. In some other embodiments of this application, the communication apparatus may be the access network device shown above, a chip in the access network device, or the like. In other words, the communication apparatus may be configured to perform steps, functions, or the like performed by the access network device or the base station in the foregoing method embodiments.

The processing unit 301 is configured to obtain first indication information, where the first indication information indicates whether a core network device supports a paging cause value.

The transceiver unit 302 is configured to output the first indication information and a first paging message, where the first paging message includes first information corresponding to a terminal device, and when the first information does not include a first field indicating the paging cause value, or when the first indication information indicates that the core network device supports the paging cause value, the first information indicates the paging cause value.

In a possible implementation, the processing unit 301 is configured to obtain the first paging message. The transceiver unit 302 is configured to output the first paging message, where the first paging message includes the first information and the first indication information.

In a possible implementation, the processing unit 301 is configured to obtain paging control information (namely, DCI). The transceiver unit 302 is configured to output the paging control information and the first paging message.

For example, that the transceiver unit 302 is configured to output the first indication information and a first paging message includes: The transceiver unit 302 is configured to: send the first indication information to the terminal device, and send the first paging message to the terminal device.

It may be understood that for a relationship between the first paging message and the first indication information shown herein, refer to the foregoing method embodiments. Details are not described herein again.

In a possible implementation, the processing unit 301 is specifically configured to obtain the first indication information based on third indication information from the core network device, where the third indication information indicates whether the core network device supports the paging cause value. The processing unit 301 is specifically configured to obtain the first indication information from an operation, administration and maintenance (OAM) device, or the processing unit 301 is specifically configured to: receive, by using the transceiver unit 302, a second paging message from the core network device, and obtain the first indication information based on a first field included in the second paging message.

In a possible implementation, when the first indication information indicates that the core network device does not support the paging cause value, the first information does not indicate the paging cause value.

In a possible implementation, when the first information includes a first field, the first information indicates a second service type (for example, a voice service).

In a possible implementation, the first indication information indicates whether a core network device supports the paging cause value, or the first indication information indicates whether a plurality of core network devices support the paging cause value.

In a possible implementation, the first information corresponds to paging initiated by the core network device.

In a possible implementation, the first paging message includes a second field indicating the paging cause value. When the first information includes the first field, the first field is included in the second field.

In a possible implementation, the transceiver unit 302 is further configured to output second indication information, where the second indication information indicates whether the communication apparatus supports the paging cause value.

In a possible implementation, when the second indication information indicates that the communication apparatus supports the paging cause value, the first paging message includes the second field indicating the paging cause value. When the first information includes the first field, the first field is included in the second field.

In a possible implementation, the first paging message further includes second information, and the second information corresponds to paging initiated by the communication apparatus.

In a possible implementation, the first indication information is included in any one of the following messages:
a non-access stratum NAS message, a system information block SIB, the first paging message, or the downlink control information DCI used to schedule the first paging message.

In a possible implementation, the first indication information is carried in a third field. When the third field does not exist, the first indication information indicates that the core network device does not support the paging cause value. When the third field exists, the first indication information indicates that the core network device supports the paging cause value.

In a possible implementation, when a value of the third field is a first value, the first indication information indicates that the core network device supports the paging cause value, or when a value of the third field is a second value, the first indication information indicates that the core network device does not support the paging cause value.

In a possible implementation, the second indication information is carried in a fourth field. When the fourth field does not exist, the second indication information indicates that the communication apparatus does not support the paging cause value. When the fourth field exists, the second indication information indicates that the communication apparatus supports the paging cause value.

In a possible implementation, when a value of the fourth field is a third value, the second indication information indicates that the communication apparatus supports the paging cause value, or when a value of the fourth field is a fourth value, the second indication information indicates that the communication apparatus does not support the paging cause value.

In this embodiment of this application, for descriptions of the first paging message, the first information, the first field, the second field, the second indication information, the third field, or the fourth field, refer to the descriptions in the foregoing method embodiments. Details are not described herein again.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the transceiver unit 302 may be further configured to perform the sending step in step 203 shown in FIG. 2.

The foregoing describes the terminal device and the access network device in embodiments of this application. The following describes possible product forms of the terminal device and the access network device. It should be understood that a product in any form that has the functions of the terminal device in FIG. 3 and a product in any form that has the functions of the access network device in FIG. 3 fall within the protection scope of embodiments of this application. It should further be understood that the following descriptions are merely examples, and do not limit product forms of the terminal device and the access network device in embodiments of this application.

In a possible implementation, in the communication apparatus shown in FIG. 3, the processing unit 301 may be one or more processors. The transceiver unit 302 may be a transceiver, or the transceiver unit 302 may be a sending unit and a receiving unit. The sending unit may be a transmitter, and the receiving unit may be a receiver. The sending unit and the receiving unit are integrated into one component, for example, a transceiver. In embodiments of this application, the processor and the transceiver may be connected by coupling or in another manner. A connection manner between the processor and the transceiver is not limited in embodiments of this application.

Figures 4, 5:
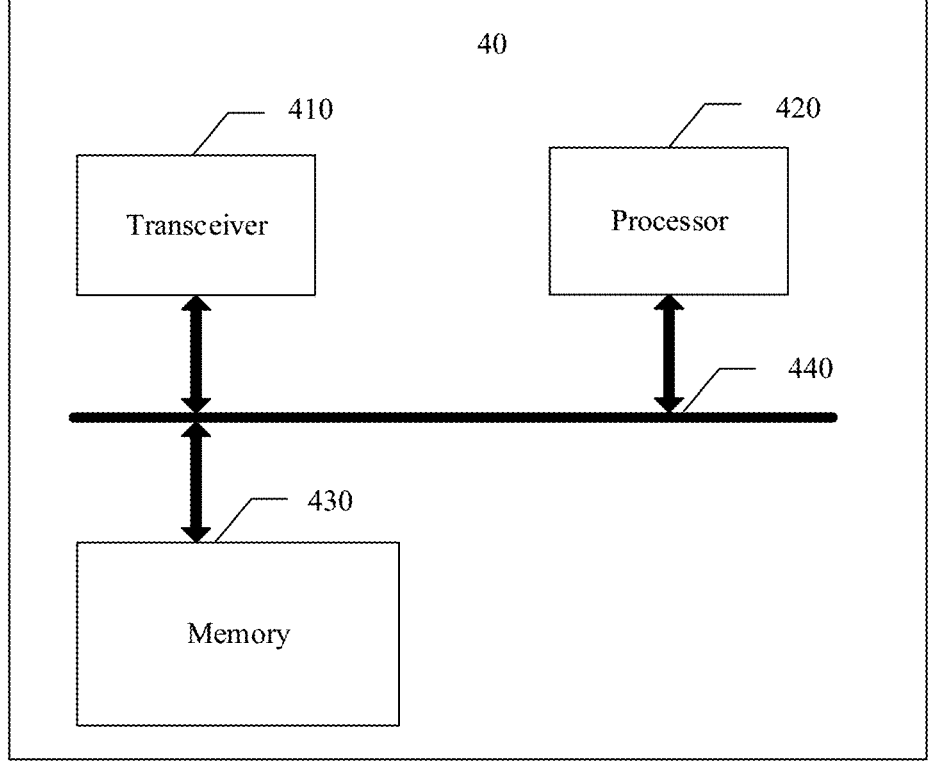

As shown in FIG. 4, a communication apparatus 40 includes one or more processors 420 and transceivers 410.

For example, when the communication apparatus is configured to perform the steps, methods, or functions performed by the terminal device or the UE, the processor 420 is configured to obtain first indication information. The transceiver 410 is configured to receive a first paging message from an access network device.

For example, when the communication apparatus is configured to perform the steps, methods, or functions performed by the access network device or the base station, the processor 420 is configured to obtain first indication information. The transceiver 410 is configured to send the first indication information and a first paging message to the terminal device.

For example, when the communication apparatus is configured to perform the steps, methods, or functions performed by the access network device or the base station, the processor 420 is configured to obtain a first paging message. The transceiver 410 is configured to send the first paging message to the terminal device, where the first paging message includes first indication information.

For example, when the communication apparatus is configured to perform the steps, methods, or functions performed by the access network device or the base station, the processor 420 is configured to obtain paging control information (for example, DCI used to schedule a first paging message). The transceiver 410 is configured to: send paging control information to the terminal device, and send the first paging message to the terminal device.

In embodiments of this application, for descriptions of the first paging message, the first information, the first field, the second field, the second indication information, the third field, or the fourth field, refer to descriptions in the foregoing method embodiments. Details are not described herein again.

It may be understood that for specific descriptions of the processor and the transceiver, refer to the descriptions of the processing unit and the transceiver unit shown in FIG. 3. Details are not described herein again.

In various implementations of the communication apparatus shown in FIG. 4, the transceiver may include a receiver and a transmitter, the receiver is configured to perform a receiving function (or operation), and the transmitter is configured to perform a transmitting function (or operation). The transceiver is configured to communicate with another device/apparatus through a transmission medium.

Optionally, the communication apparatus 40 may further include one or more memories 430, configured to store program instructions and/or data. The memory 430 is coupled with the processor 420. The coupling in embodiments of this application may be an indirect coupling or a communication connection between apparatuses, units, or modules in an electrical form, a mechanical form, or another form, and is used for information exchange between the apparatuses, the units, or the modules. The processor 420 and the memory 430 may perform an operation cooperatively. The processor 420 may execute the program instructions stored in the memory 430. Optionally, at least one of the one or more memories may be included in the processor.

A specific connection medium between the transceiver 410, the processor 420, and the memory 430 is not limited in embodiments of this application. In an embodiment of this application, the memory 430, the processor 420, and the transceiver 410 are connected through a bus 440 in FIG. 4. The bus is indicated by a bold line in FIG. 4. A manner of a connection between other components is merely an example for description, and imposes no limitation. The bus may be classified into an address bus, a data bus, a control bus, and the like. For ease of indication, the bus is indicated by only one thick line in FIG. 4. However, this does not indicate that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the methods disclosed with reference to embodiments of this application may be directly executed and accomplished by a hardware processor, or may be executed and accomplished by using a combination of hardware and software modules in the processor.

In embodiments of this application, the memory may include but is not limited to a nonvolatile memory, for example, a hard disk drive (HDD) or a solid-state drive (SSD), a random access memory (RAM), an erasable programmable read-only memory (EPROM), a read-only memory (ROM), or a compact disc read-only memory (CD-ROM). The memory is any storage medium that can be used to carry or store program code in a form of an instruction or a data structure and that can be read and/or written by a computer (for example, the communication apparatus shown in this application). However, this is not limited thereto. The memory in embodiments of this application may alternatively be a circuit or any other apparatus that can implement a storage function, and is configured to store the program instructions and/or the data.

When the communication apparatus is the terminal device or the UE, the processor 420 is mainly configured to: process a communication protocol and communication data, control the entire communication apparatus, execute a software program, and process data of the software program. The memory 430 is mainly configured to store the software program and data. The transceiver 410 may include a control circuit and an antenna. The control circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, for example, a touchscreen, a display, or a keyboard, is mainly configured to: receive data entered by a user, and output data to the user.

After the communication apparatus is powered on, the processor 420 may read the software program in the memory 430, interpret and execute instructions of the software program, and process the data of the software program. When data needs to be sent wirelessly, the processor 420 performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 420. The processor 420 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in an embodiment of this application may alternatively include more components or the like than those shown in FIG. 4. This is not limited in embodiments of this application. The methods performed by the processor and the transceiver are merely examples. For specific steps performed by the processor and the transceiver, refer to the methods described above.

In another possible implementation, in the communication apparatus shown in FIG. 3, the processing unit 301 may be one or more logic circuits, and the transceiver unit 302 may be an input/output interface, which is also referred to as a communication interface, an interface circuit, an interface, or the like. Alternatively, the transceiver unit 302 may be a sending unit and a receiving unit. The sending unit may be an output interface, and the receiving unit may be an input interface. Alternatively, the sending unit and the receiving unit are integrated into one unit, for example, an input/output interface. As shown in FIG. 5, a communication apparatus shown in FIG. 5 includes a logic circuit 501 and an interface 502. In other words, the processing unit 301 may be implemented by using the logic circuit 501, and the transceiver unit 302 may be implemented by using the interface 502. The logic circuit 501 may be a chip, a processing circuit, an integrated circuit, a system on chip (SoC), or the like. The interface 502 may be a communication interface, an input/output interface, a pin, or the like. For example, FIG. 5 shows an example in which the communication apparatus is a chip. The chip includes the logic circuit 501 and the interface 502.

In an embodiment of this application, the logic circuit may further be coupled to the interface. A specific connection manner of the logical circuit and the interface is not limited in embodiments of this application.

For example, when the communication apparatus is configured to perform the methods, functions, or steps performed by the terminal device, the logic circuit 501 is configured to obtain first indication information. The interface 502 is configured to input a first paging message.

For example, when the communication apparatus is configured to perform the methods, functions, or steps performed by the access network device, the logic circuit 501 is configured to obtain first indication information. The interface 502 is configured to output the first indication information and a first paging message. Alternatively, the logic circuit 501 is configured to obtain a first paging message, where the first paging message includes first indication information. The interface 502 is configured to output the first paging message. Alternatively, the logic circuit 501 is configured to obtain paging control information. The interface 502 is configured to output the paging control information and a first paging message, where the paging control information includes first indication information.

In this embodiment of this application, for descriptions of the first paging message, the first information, the first field, the second field, the second indication information, the third field, or the fourth field, refer to the descriptions in the foregoing method embodiments. Details are not described herein again.

For specific implementations of the embodiments shown in FIG. 5, refer to the foregoing embodiments. Details are not described herein again.

An embodiment of this application further provides a wireless communication system. The wireless communication system includes a terminal device and an access network device. The terminal device and the access network device may be configured to perform the method in any one of the foregoing embodiments.

An embodiment of this application further provides a wireless communication system. The wireless communication system includes an access network device and a core network device. The access network device and the core network device may be configured to perform the method in any one of the foregoing embodiments.

An embodiment of this application further provides a wireless communication system. The wireless communication system includes a terminal device, an access network device, and a core network device. The terminal device, the access network device, and the core network device may be configured to perform the method in any one of the foregoing embodiments.

In addition, this application further provides a computer program. The computer program is used to implement operations and/or processing performed by the terminal device in the method provided in this application.

This application further provides a computer program. The computer program is used to implement operations and/or processing performed by the access network device in the method provided in this application.

This application further provides a computer-readable storage medium. The computer-readable storage medium stores computer code. When the computer code is run on a computer, the computer is enabled to perform operations and/or processing performed by the terminal device in the method provided in this application.

This application further provides a computer-readable storage medium. The computer-readable storage medium stores computer code. When the computer code is run on a computer, the computer is enabled to perform operations and/or processing performed by the access network device in the method provided in this application.

This application further provides a computer program product. The computer program product includes computer code or a computer program. When the computer code or the computer program is run on a computer, operations and/or processing performed by the terminal device in the method provided in this application are/is performed.

This application further provides a computer program product. The computer program product includes computer code or a computer program. When the computer code or the computer program is run on a computer, operations and/or processing performed by the access network device in the method provided in this application are/is performed.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the technical effects of the solutions provided in embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the methods described in embodiments of this application. The readable-storage medium includes any medium that can store program code, like a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A paging indication method performed by a terminal device or a chip configured for a terminal device, the method comprising:

obtaining first indication information that indicates whether a core network device supports a paging cause value;

receiving a first paging message comprising extended paging record list comprising first information, wherein the first information is information associated with the terminal device, wherein the paging by the core network device is for a non-voice service based on the first paging message comprising the extended paging record list, the first information not comprising a first field indicating the paging cause value, and the first indication information indicating the core network device supports the paging cause value, and wherein the paging cause value is not indicated based on the first paging message comprising the extended paging record list, the first information not comprising the first field indicating the paging cause value, and the first indication information indicating the core network device does not support the paging cause value.

2. The method according to claim 1, wherein the paging cause value is a voice service based on the first paging message comprising the extended paging record list and the first information comprising the first field indicating the paging cause value.

3. The method according to claim 1, further comprising:

determining, based on the first indication information, whether the core network device, associated with a first public land mobile network (PLMN), supports the paging cause value, wherein the first PLMN is a PLMN serving the terminal device.

4. The method according to claim 1, further comprising:

obtaining second indication information that indicates whether an access network device supports the paging cause value.

5. The method according to claim 4, wherein based on the second indication information indicating the access network device supports the paging cause value, the first paging message comprises a second field indicating the paging cause value; and based on the first information comprising the first field, the first field is comprised in the second field.

6. The method according to claim 1, wherein the first paging message further comprises second information associated with paging initiated by an access network device.

7. The method according to claim 1, wherein obtaining the first indication information comprises receiving a registration accept message that includes the first indication information.

8. The method according to claim 7, wherein before receiving the registration accept message, the method further comprises sending a registration request message that includes information indicating whether the terminal device supports the paging cause value.

9. The method according to claim 7, wherein the first indication information is carried in a third field, and based on the third field not existing, the first indication information indicates that the core network device does not support the paging cause value, or based on the third field existing, the first indication information indicates that the core network device supports the paging cause value.

10. A communication apparatus comprising a logic circuit and an interface, wherein the logic circuit is coupled to the interface; and the interface is configured to input and/or output code instructions, and the logic circuit is configured to execute the code instructions, so that the method according to claim 1 is performed.

11. A non-transitory computer-readable storage medium, wherein the non-transitory computer-readable storage medium is configured to store a computer program, and based on the computer program being executed, the method according to claim 1 is performed.

12. A paging indication method performed by a network device or a chip configured for a network device, the method comprising:

sending first indication information that indicates whether a core network device supports a paging cause value; and sending a first paging message comprising extended paging record list comprising first information, wherein the first information is information associated with a terminal device, wherein paging by the core network device is for a non-voice service based on the first paging message comprising the extended paging record list, the first information not comprising a first field indicating the paging cause value, and the first indication information indicating the core network device supports the paging cause value, and wherein the paging cause value is not indicated based on the first paging message comprising the extended paging record list, the first information not comprising a first field indicating the paging cause value, and the first indication information indicating the core network device does not support the paging cause value.

13. The method according to claim 12, wherein the paging cause value is voice service based on the first paging message comprising the extended paging record list and the first information comprising the first field indicating the paging cause value.

14. The method according to claim 12, wherein sending the first indication information comprises sending a registration accept message that includes the first indication information.

15. The method according to claim 14, wherein a registration request message includes information indicating whether the terminal device supports the paging cause value.

16. A communication apparatus comprising a processor configured to execute computer-executable instructions, to perform a paging indication method including:

obtaining first indication information that indicates whether a core network device supports a paging cause value; and receiving a first paging message comprising extended paging record list comprising first information, wherein the first information is information associated with a terminal device, wherein the paging by the core network device is for non-voice service based on the first paging message comprising the extended paging record list, the first information not comprising a first field indicating the paging cause value, and the first indication information indicating the core network device supports the paging cause value, and wherein the paging cause value is not indicated based on the first paging message comprising the extended paging record list, the first information not comprising the first field indicating the paging cause value, and the first indication information indicating the core network device does not support the paging cause value.

* * * * *